US011904925B2

(12) United States Patent
Ma et al.

(10) Patent No.: US 11,904,925 B2
(45) Date of Patent: Feb. 20, 2024

(54) FOLDING STROLLER

(71) Applicant: GOODBABY CHILD PRODUCTS CO., LTD., Jiangsu (CN)

(72) Inventors: Fusheng Ma, Suzhou (CN); Xingrong Zhang, Suzhou (CN); Yang Zhang, Suzhou (CN); Pingzhong Shi, Suzhou (CN)

(73) Assignee: GOODBABY CHILD PRODUCTS CO., LTD., Jiangsu (CN)

( * ) Notice: Subject to any disclaimer, the term of this patent is extended or adjusted under 35 U.S.C. 154(b) by 269 days.

(21) Appl. No.: 17/280,957

(22) PCT Filed: Nov. 14, 2019

(86) PCT No.: PCT/CN2019/118296
§ 371 (c)(1),
(2) Date: Mar. 29, 2021

(87) PCT Pub. No.: WO2020/064025
PCT Pub. Date: Apr. 2, 2020

(65) Prior Publication Data
US 2021/0380155 A1 Dec. 9, 2021

(30) Foreign Application Priority Data

Sep. 29, 2018 (CN) .......................... 201811146816.X
Jun. 17, 2019 (CN) .......................... 201910521047.5

(51) Int. Cl.
*B62B 7/06* (2006.01)
*B62B 7/08* (2006.01)
*B62B 7/14* (2006.01)

(52) U.S. Cl.
CPC ............... *B62B 7/08* (2013.01); *B62B 7/062* (2013.01); *B62B 7/142* (2013.01); *B62B 2205/121* (2013.01)

(58) Field of Classification Search
CPC ...... B62B 7/08; B62B 7/062; B62B 2205/121
See application file for complete search history.

(56) References Cited

U.S. PATENT DOCUMENTS 9,346,479 B1 * 5/2016 Ransil ..................... B62B 7/064
10,850,760 B2 * 12/2020 Shapiro .................. B62B 7/083
(Continued)

FOREIGN PATENT DOCUMENTS

CN 106627721 A 5/2017
CN 107985378 A 5/2018
(Continued)

OTHER PUBLICATIONS

International Search Report dated Feb. 7, 2020 for PCT/CN2019/118296.

*Primary Examiner* — Erez Gurari
(74) *Attorney, Agent, or Firm* — Schmeiser, Olsen & Watts, LLP

(57) ABSTRACT

A folding stroller, including a frame capable of being unfolded and folded, and a front wheel and a rear wheel, wherein the frame including a push rod connected to the front wheel at a bottom, and a rear support connected to the rear wheel at a bottom, any two of the push rod, the front support and the rear support are rotatably connected with each other, the remaining one is rotatably connected to at least one of the two, and when the frame is in an unfolded state, the push rod, the front support and the rear support are unfolded with respect to one another, and when the frame is in a folded state, the push rod, the front support and the rear support are close to one another, and the front wheel and the rear wheel are turned so that axles thereof extend along a front-rear direction.

19 Claims, 30 Drawing Sheets

(56) References Cited

U.S. PATENT DOCUMENTS

| | | | |
|---|---|---|---|
| 2011/0204600 A1 | 8/2011 | Lai | |
| 2015/0102587 A1* | 4/2015 | Wu | B62B 7/08 |
| | | | 280/642 |
| 2020/0283051 A1* | 9/2020 | Liao | B62B 7/062 |
| 2021/0163054 A1* | 6/2021 | De Vrede | B62B 5/067 |
| 2021/0380155 A1* | 12/2021 | Ma | B62B 7/08 |

FOREIGN PATENT DOCUMENTS

| | | |
|---|---|---|
| CN | 207311555 U | 5/2018 |
| CN | 109178077 A | 1/2019 |
| IN | 207106587 U | 3/2018 |
| WO | 2007053021 A1 | 5/2007 |

\* cited by examiner

FOLDING STROLLER

CROSS-REFERENCE TO RELATED APPLICATIONS

This application claims priority to PCT Application No. PCT/CN2019/118296, having a filing date of Nov. 14, 2019, which is based on Chinese Application No. 201910521047.5, having a filing date of Jun. 17, 2019 and Chinese Application No. 201811146816.X, having a filing date of Sep. 29, 2018, the entire contents all of which are hereby incorporated by reference.

FIELD OF TECHNOLOGY

The following relates to a folding stroller.

BACKGROUND

Folding strollers are widely used as a means of transportation for babies. It is convenient to fold and has a small volume after folding to make it easy to store and easy to carry, which is the consumer's demand for the use of folding strollers. Conventional folding strollers generally include a foldable frame, wheels installed under the frame, a locking device that can lock the frame in an unfolded state, and a sitting saddle mounted on the frame for babies to ride. The existing folding strollers generally have a relatively large volume after being folded, and take up more space for carrying and storing.

SUMMARY

An aspect relates to a folding stroller which is more flat and smaller in size after being folded. To achieve the above purpose, the technical solution employed by the present disclosure is: a folding stroller, comprises a frame capable of being unfolded and folded, and a front wheel and a rear wheel connected to the bottom of the frame, wherein the frame comprises a push rod, a front support connected to the front wheel at the bottom, and a rear support connected to the rear wheel, any two of the push rod, the front support and the rear support are rotatably connected with each other, the remaining one is rotatably connected to at least one of the two; when the frame is in an unfolded state, the push rod, the front support and the rear support are unfolded with respect to one another; when the frame is in a folded state, the push rod, the front support and the rear support are close to one another, and the front wheel and the rear wheel are turned so that axles thereof extend along a front-rear direction.

Further, the frame further comprises:

an upper push rod rotatably connected with an upper portion of the push rod;

an upper connecting rod, an upper portion thereof being rotatably connected with a lower portion of the upper push rod, and the upper connecting rod being rotatably connected with the rear support;

a front connecting rod, a front portion thereof being rotatably connected with the front support;

a rear connecting rod, a front portion thereof being rotatably connected with the front connecting rod, and a rear portion of the rear connecting rod being rotatably connected with the rear support; and a lower sliding sleeve slidably connected to the rear connecting rod along a length direction of the rear connecting rod, a lower portion of the upper connecting rod being rotatably connected with the lower sliding sleeve.

Further, a first wheel turnover mechanism is provided between the front support and the front wheel, a second wheel turnover mechanism is provided between the rear support and the rear wheel, and the first wheel turnover mechanism and the second wheel turnover mechanism both act to turn over the front wheel and the rear wheel respectively during a transition of the frame from the unfolded state to the folded state.

More further, at least one of the first wheel turnover mechanism and the second wheel turnover mechanism comprises a wheel connector capable of being pivotally and slidably connected with the front support or the rear support and having a spiral groove, a drive rod provided on the front support or the rear support and capable of being slidably connected with the spiral groove, and a drive part driven to move by folding the frame and capable of driving the wheel connector to slide, and the front wheel or the rear wheel is mounted on the wheel connector.

Optionally, at least one of the first wheel turnover mechanism and the second wheel turnover mechanism comprises a wheel connector capable of being pivotally connected with the front support or the rear support and having a spiral groove, a drive rod of which an end portion is slidably connected with the spiral groove, and a first connecting piece connected with the drive rod, the first connecting piece is rotatably connected with the front connecting rod or the rear connecting rod, and the front wheel or the rear wheel is mounted on the wheel connector.

Optionally, there are two front wheels or rear wheels which are arranged symmetrically on the left and right sides of the folding stroller, there are two wheel connectors which are arranged symmetrically on the left and right sides of the folding stroller, the front wheels or the rear wheels are mounted to the wheel connectors on the same sides, and left and right end portions of the drive rods are slidably connected with the spiral grooves of the wheel connectors on left and right side, respectively. More further, there are two first connecting pieces which are arranged symmetrically on the left and right sides of the folding stroller, and the two first connecting pieces are fixedly connected through a transverse connecting piece. More further, a second connecting piece is fixed to the front connecting rod or the rear connecting rod, and the first connecting piece is rotatably connected to the second connecting piece.

Further, a lower portion of the spiral groove is in communication with a fixing groove, and when the frame is in the unfolded state, an end portion of the drive rod is connected within the fixing groove so as to keep the axle of the front wheel or the rear wheel extending along a left-right direction.

Further, the first turnover mechanism and the second turnover mechanism have the same structure, and both are symmetrically provided on the front and rear sides of the folding stroller.

Further, the lower portion of the push rod, an upper portion of the front support and an upper portion of the rear support are coaxially and rotatably connected.

Further, the frame further comprises:

a seat rod, a front portion thereof is rotatably connected with the rear support, and a rear portion thereof is rotatably connected with the upper connecting rod;

a seat plate slidably connected with the seat rod along a front-rear direction; and a pull rod, a front portion thereof is rotatably connected with the seat plate, and a rear portion thereof is rotatably connected with the upper connecting rod.

More further, there are two rear supports which are arranged symmetrically on the left and right sides of the folding stroller, and a rear transverse rod is fixedly connected between the two rear supports, and a front portion of the seat rod is rotatably connected to the rear transverse rod.

The present disclosure further provides another technical solution: a folding stroller, comprises a frame capable of being opened and folded, and a front wheel and a rear wheel connected to the bottom of the frame, the frame comprises a push rod, a front support connected to the front wheel at the bottom, and a rear support connected to the rear wheel at the bottom, any two of the push rod, the front support and the rear support are rotatably connected to each other, the remaining one is rotatably connected to at least one of the two, and the front wheel and the front support, and the rear wheel and the rear support both are connected through wheel connectors; when the frame is folded from an unfolded state to a folded state, the wheel connectors are respectively rotated on the front support and the rear support with the folding of the frame, and the front wheel and the corresponding rear wheel are close to each other.

In an embodiment, the frame further comprises a plurality of rods, and when the frame is in the folded state, the front wheel and the rear wheel are in contact with the ground, and the push rod or at least one of the plurality of rods is also in contact with the ground, such that the folding stroller stands on its own.

Due to the use of the above technical solutions, after being folded, the folding stroller is flat, very small in size and self-standing, and the folding stroller is simple in structure, clever in design and convenient in operation.

BRIEF DESCRIPTION

Some of the embodiments will be described in detail, with references to the following Figures, wherein like designations denote like members, wherein.

Figure 1:
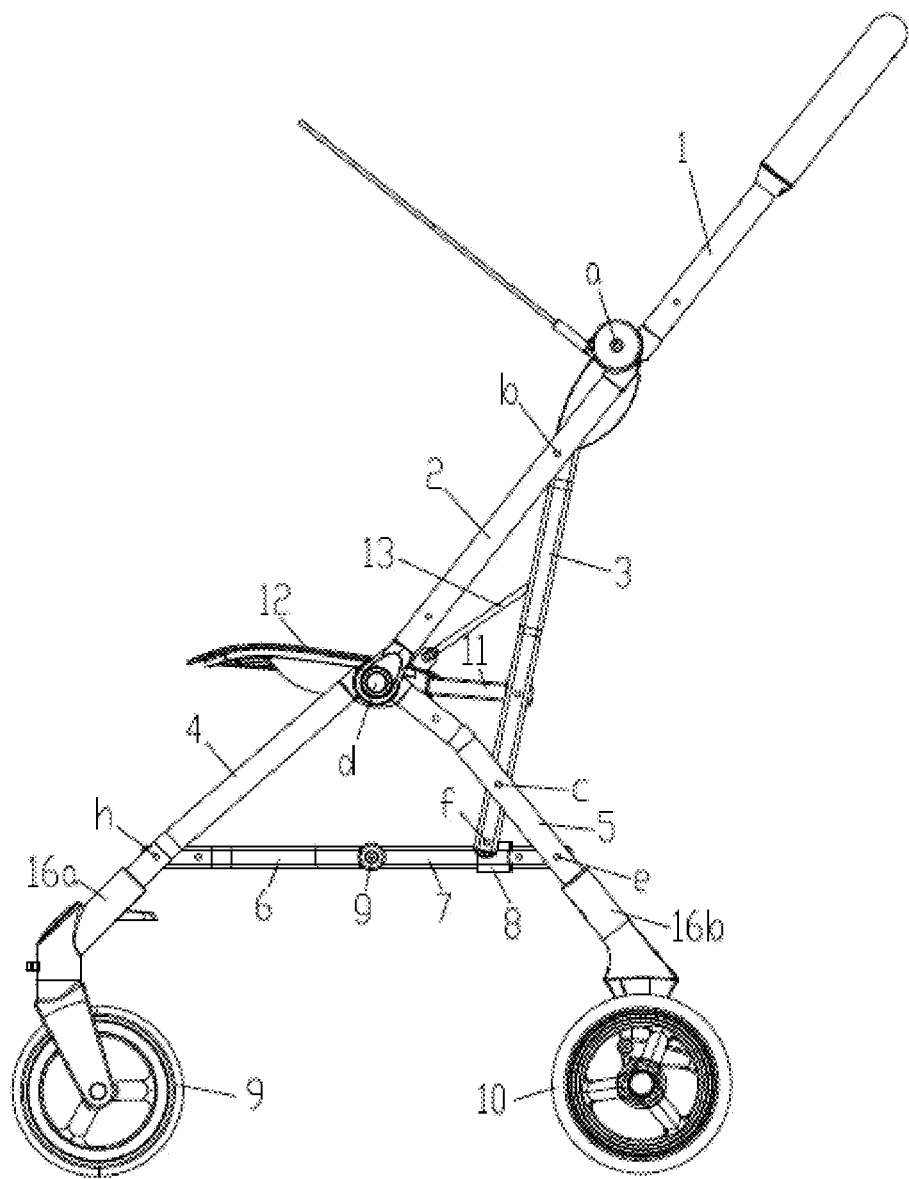
FIG. 1 is a side structure diagram of the folding stroller in the unfolded state in Embodiment 1.
Figure 2:
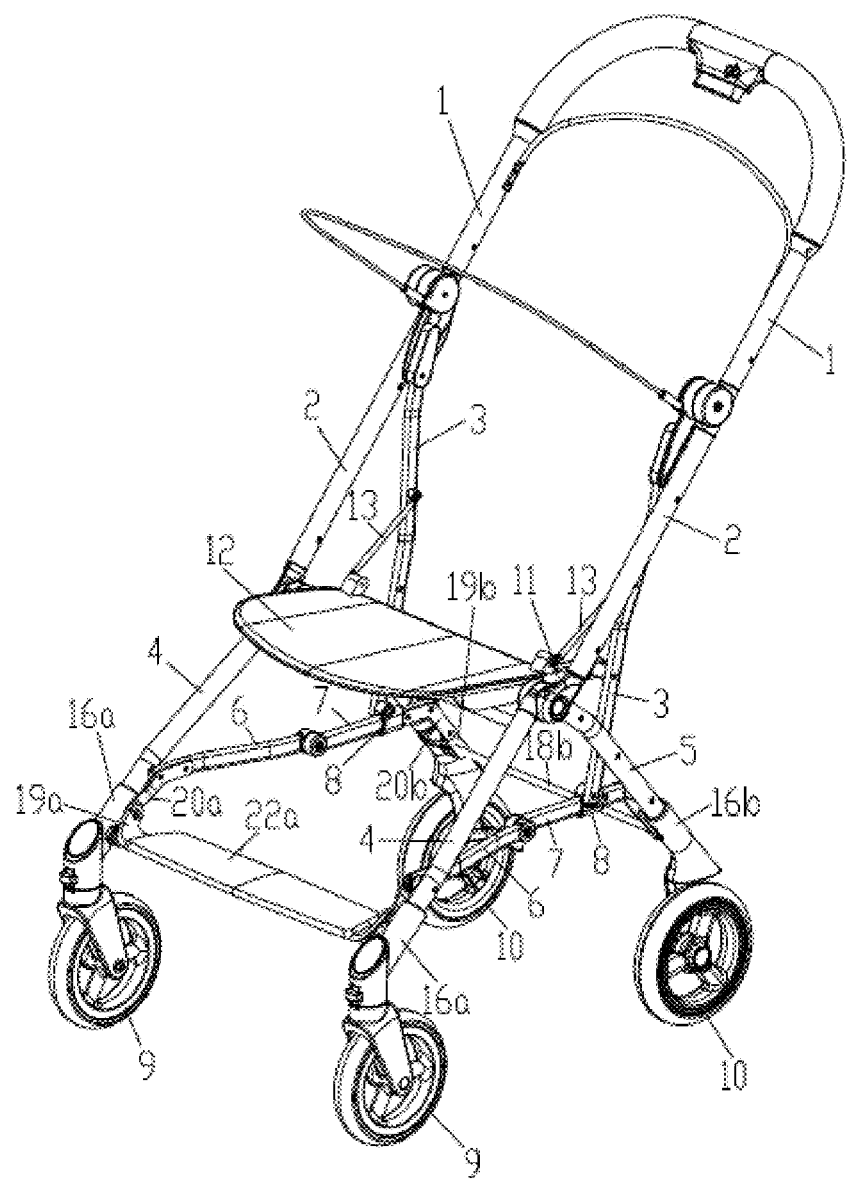
FIG. 2 is a three-dimensional structure diagram of the folding stroller in the unfolded state in Embodiment 1.
Figure 3:
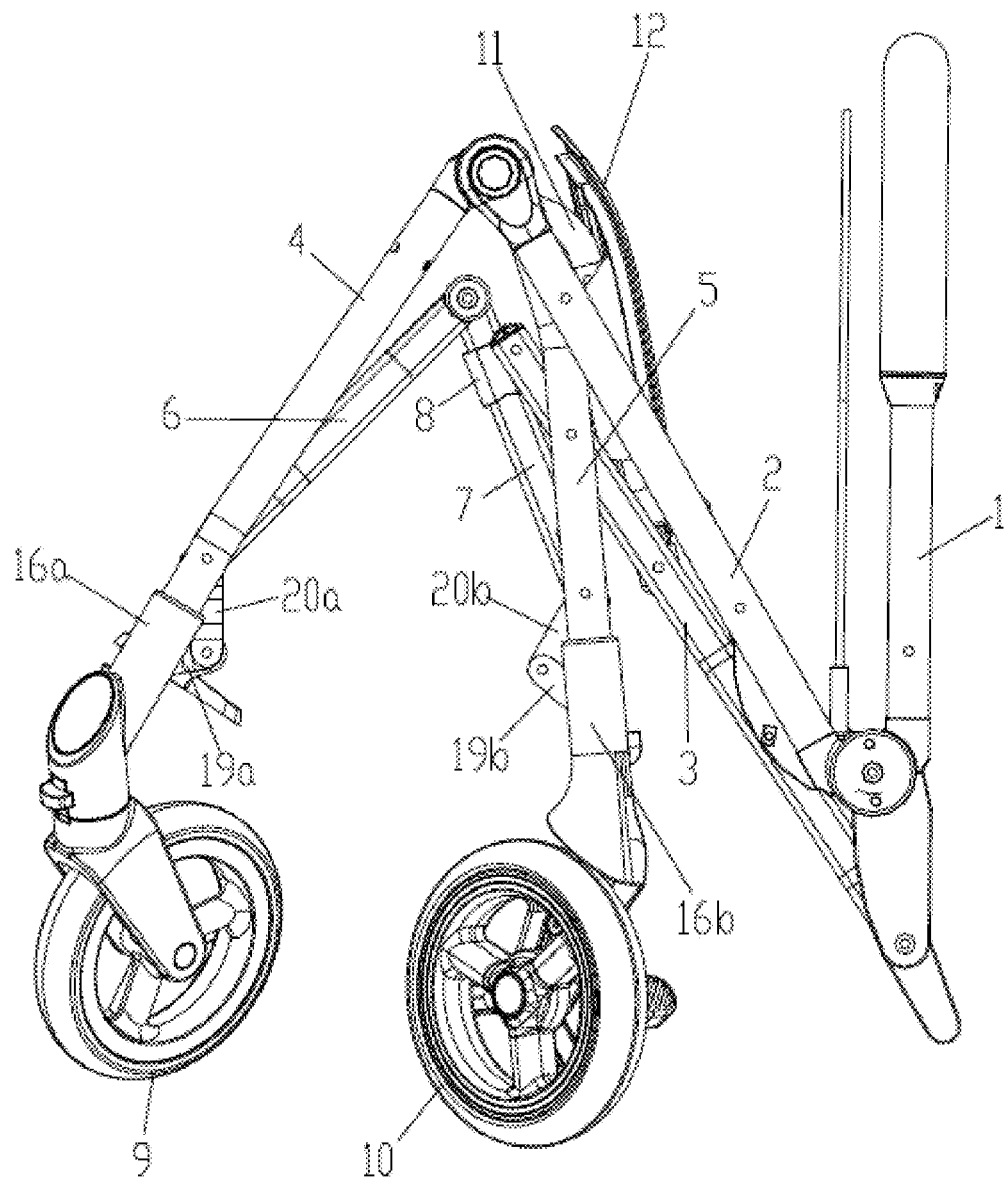
FIG. 3 is a side structure diagram of the folding stroller in Embodiment 1 during the folding process.
Figure 4:
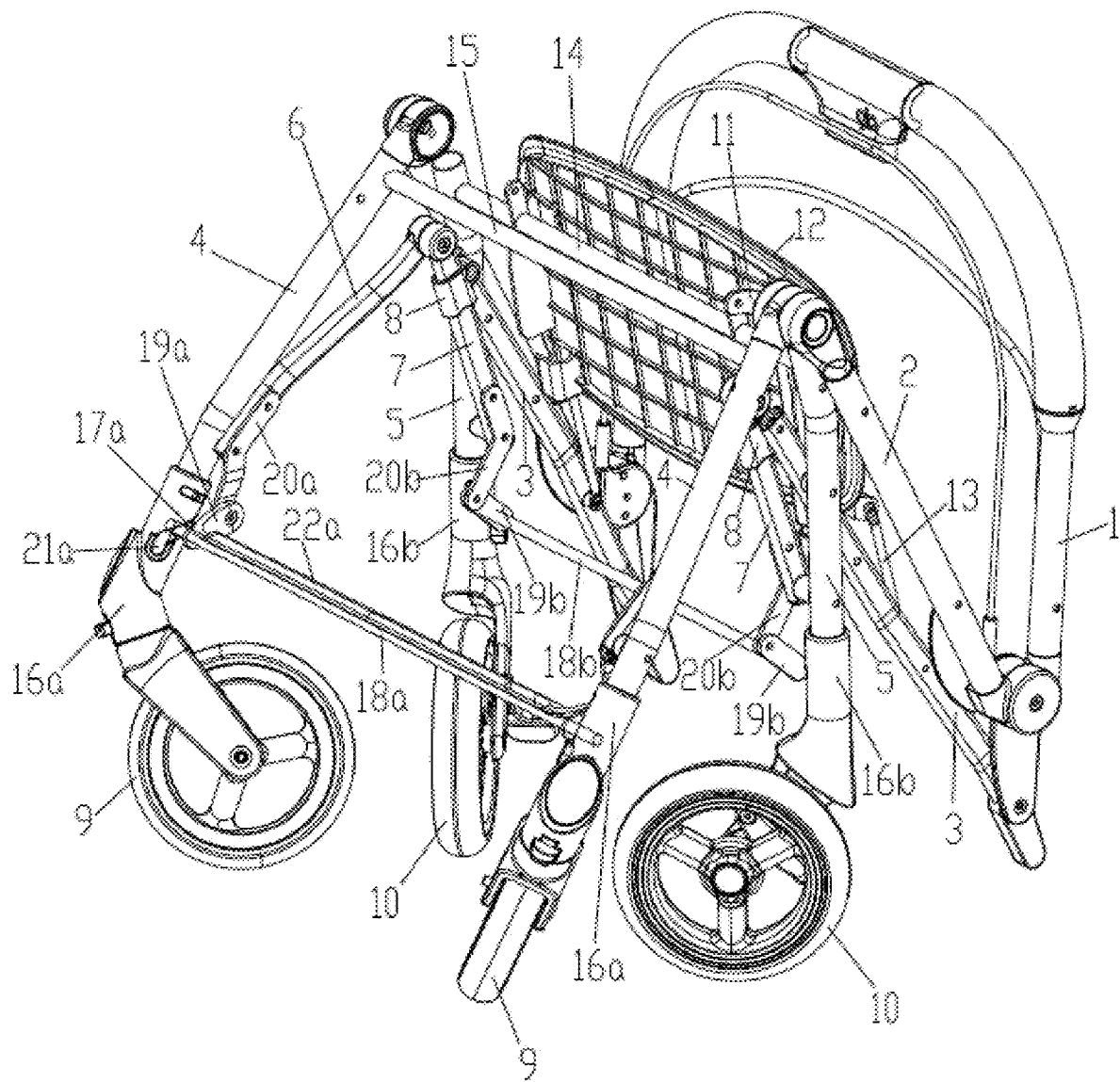
FIG. 4 is a three-dimensional structure diagram of the folding stroller in Embodiment 1 during the folding process.
Figure 5:
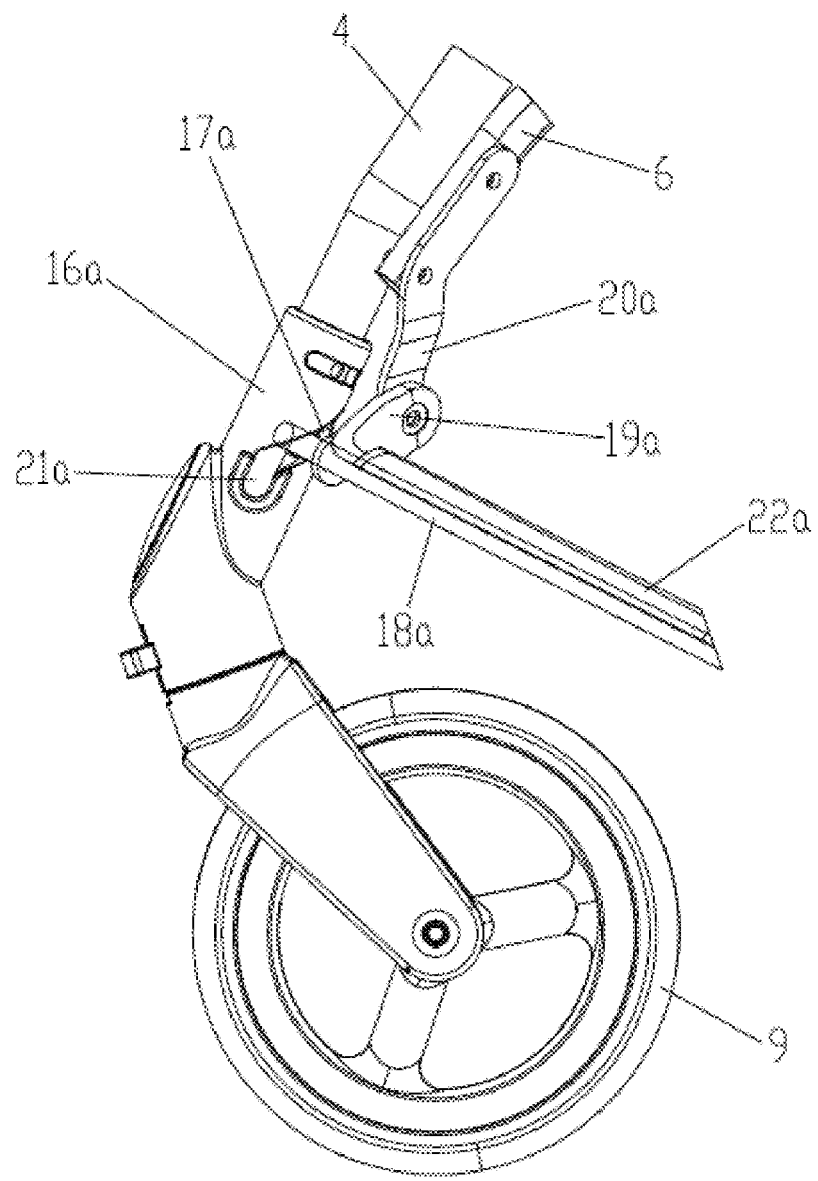
FIG. 5 is a partial structural diagram of FIG. 4.
Figure 6:
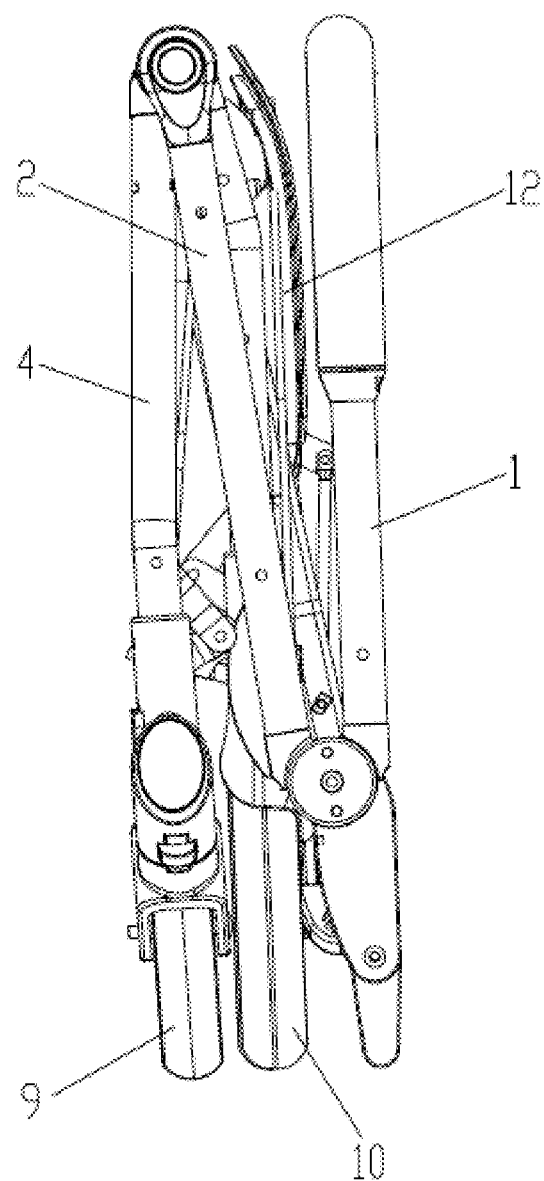
FIG. 6 is a side structure diagram of the folding stroller in the folded state in Embodiment 1.
Figure 7:
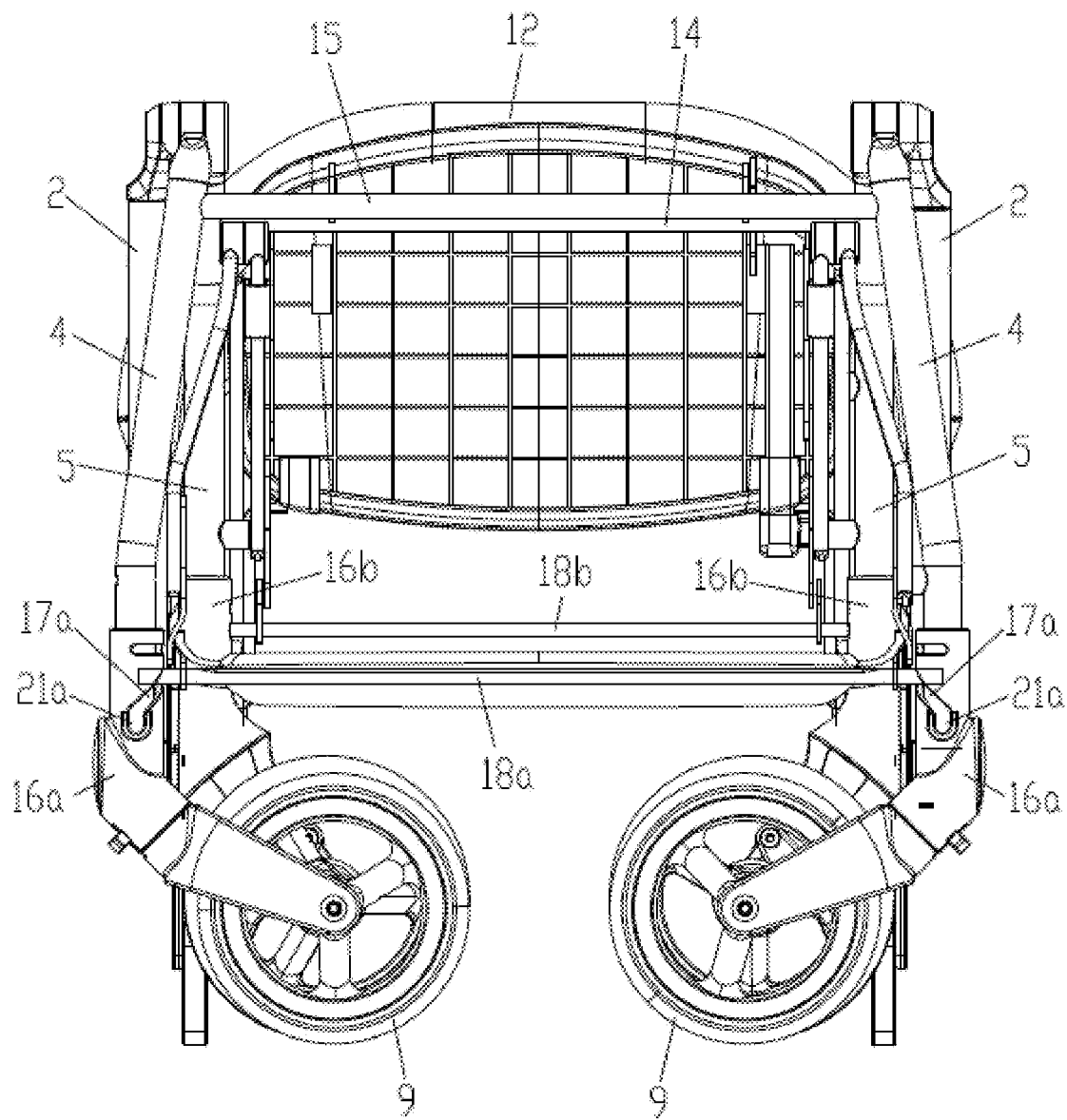
FIG. 7 is a front structure diagram of the folding stroller in the folded state in Embodiment 1.
Figure 8:
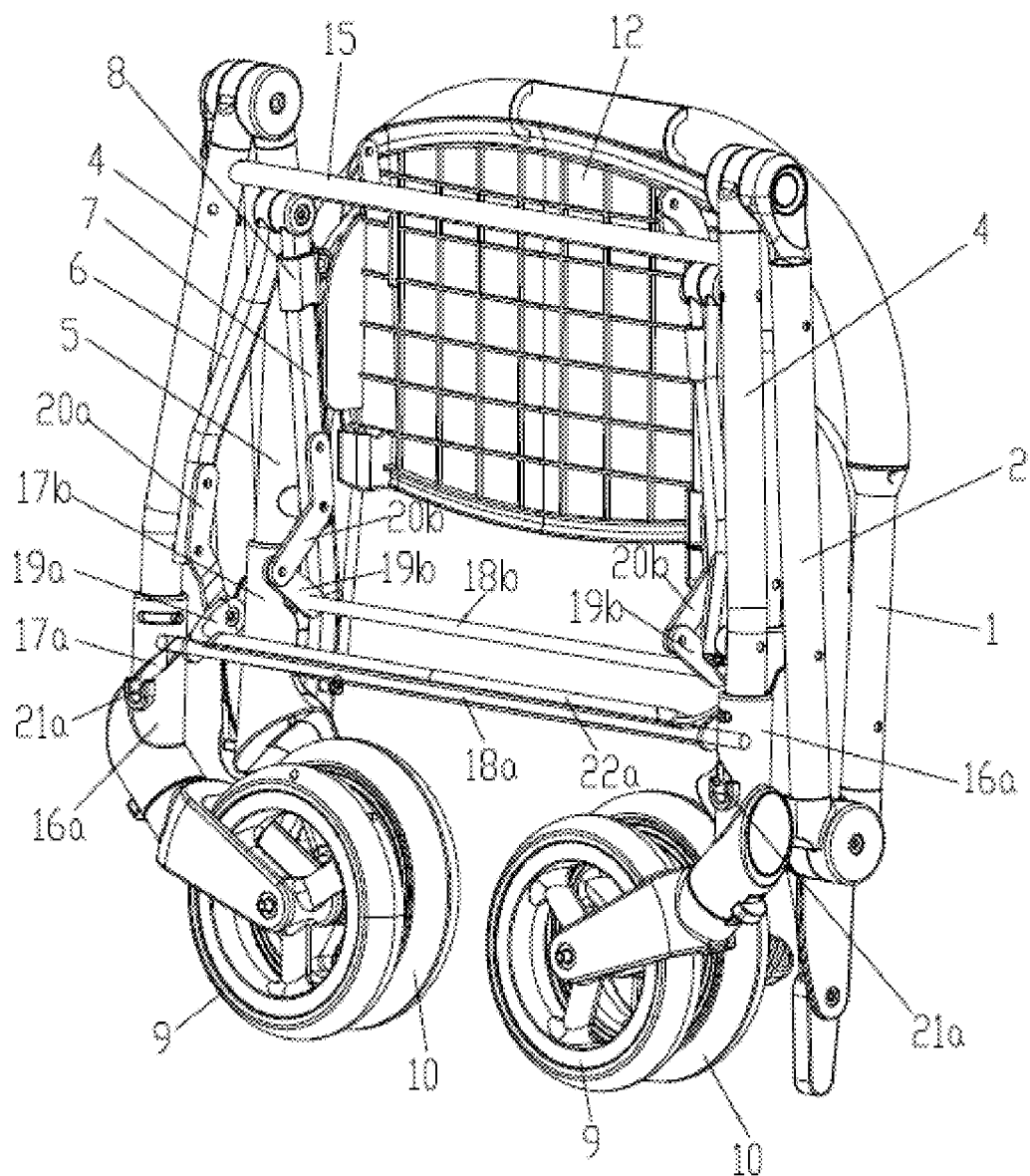
FIG. 8 is a three-dimensional structure diagram of the folding stroller in the folded state in Embodiment 1.

1—upper push rod; 2—lower push rod; 3—upper connecting rod; 4—front support; 5—rear support; 6—front connecting rod; 7—rear connecting rod; 8—lower sliding sleeve; 9—front wheel; 10—rear wheel; 11—seat rod; 12—seat plate; 13—pull rod; 14—rear transverse rod; 15—front transverse rod; 16a—front wheel connector; 16b—rear wheel connector; 17a—front spiral groove; 18a—front drive rod; 18b—rear drive rod; 19a—first front connecting piece; 19b—first rear connecting piece; 20a—second front connecting piece; 20b—second rear connecting piece; 21a—front fixing groove; 22a—front transverse connecting rod; 23—connector; 24—seat saddle connector; 25—seat saddle; 26—armrest; 27—drive part; 28—upper transverse connecting rod; 29—front transverse connecting rod; 30—rear transverse connecting rod 31—upper sliding sleeve; 32—seat saddle upper frame; 33—seat saddle lower frame; 34—rotating seat; 341—second step; 342—second spiral surface; 35—sliding seat; 351—first step; 352—first spiral surface; 353—protrusion; 36—locking part; 37—first elastic element; 38—second elastic element; 39—inner plug; 40—second elastic element fixing seat; 41—rivet; 42—waist-shaped hole.

DETAILED DESCRIPTION

In the following, the preferable embodiments of the present disclosure are explained in detail combining with the accompanying drawings so that the advantages and features of the present disclosure can be easily understood by the skilled persons in the art.

Embodiment 1

As can be seen from the structural schematic diagrams of FIGS. 1 to 8, the folding stroller in this embodiment comprises a frame capable of being unfolded and folded, a front wheel 8 and a rear wheel 10 connected to the bottom of the frame, and a locking device for locking the frame in an unfolded state.

The frame comprises a push rod 2, a front support 24 connected to the front wheel 9 at the bottom, and a rear support 5 connected to the rear wheel 10 at the bottom, any two of the push rod 2, the front support 4 and the rear support 5 are rotatably connected to each other, the remaining one is rotatably connected to at least one of the two; when the frame is in the unfolded state, the push rod 2, the front support 4 and the rear support 5 are unfolded with respect to one another, and axles of the front wheel 9 and the rear wheel 10 extend along a left-right direction; when the frame is in a folded state, the push rod 2, the front support 4 and the rear support 5 are close to one another, and the front wheel 9 and the rear wheel 10 are turned so that the axles extend along a front-rear direction.

In this embodiment, a frame structure is given, and in addition to the push rod 2, the front support 4 and the rear support 5 mentioned above, it further comprises an upper push rod 1, an upper connecting rod 3, a front connecting rod 6, a rear connecting rod 7, and a lower sliding sleeve 8.

The upper push rod 1 is rotatably connected with an upper portion of the push rod 2 via a rotating shaft a.

An upper portion of the upper connecting rod 3 is rotatably connected with a lower portion of the upper push rod 1 via a rotating shaft b. In this embodiment, the rotating shaft b is located below the rotating shaft a. The upper connecting rod 3 is rotatably connected with the rear support 5 via a rotating shaft c. An upper portion of the rear support 5, an upper portion of the front support 4, and a lower portion of the push rod 2 are rotatably connected via a same rotating shaft d. In this embodiment, the rotating shaft c is located below the rotating shaft b and the rotating shaft d.

A front portion of the front connecting rod 6 is rotatably connected with the front support 4 via a rotating shaft h, and in this embodiment, the rotating shaft h is located between the rotating shaft d and the front wheel 9.

A front portion of the rear connecting rod 7 is rotatably connected with the front connecting rod 6 via a rotating shaft g, a rear portion of the rear connecting rod 7 is rotatably connected with the rear support 5 via a rotating shaft e, and in this embodiment, the rotating shaft e is located between the rotating shaft c and the rear wheel 1, that is, the rotating shaft c is located between the rotating shaft d and the rotating shaft e.

The lower sliding sleeve 8 is slidably connected to the rear connecting rod 7 along the length direction of the rear connecting rod 7, and in this embodiment, the lower sliding sleeve 8 slides between the rotating shaft g and the rotating shaft e, when the frame is in the unfolded state, the lower sliding sleeve 8 is close to the rotating shaft e, and when the frame is in the folded state, the lower sliding sleeve 8 is close to the rotating shaft g. A lower portion of the upper connecting rod 3 is rotatably connected with the lower sliding sleeve 8 via a rotating shaft f, and in this embodiment, the rotating shaft f is located below the rotating shaft c, that is, the rotating shaft c is located between the rotating shaft b and the rotating shaft f.

The upper push rod 1, the push rod 2, the upper connecting rod 3, and the rear support 5 form a first four-bar linkage; the rear support 5, the upper connecting rod 3, the rear connecting rod 7, and the lower sliding sleeve 8 form a crank-slider mechanism linked with the first four-bar linkage; the rear support 5, the rear connecting rod 7, the front support 4, and the front connecting rod 6 form a second four-bar linkage linked with the first four-bar linkage and the slider-crank mechanism.

In a more preferred embodiment, the frame further comprises a seat rod 11 rotatably connected to the rear support 5 at the front portion and rotatably connected to the upper connecting rod 3 at the rear portion, a seat plate 12 slidably connected to the seat rod 11 back and forth, a pull rod 13 rotatably connected to the seat rod 12 at the front portion and rotatably connected to the upper connecting rod 3 at the rear portion. In an embodiment, the connection of the seat rod 11 and the upper connecting rod 3 is located between the rotating shaft b and the rotating shaft c.

In this embodiment, the upper push rod 1, the push rod 2, the upper connecting rod 3, the front support 4, the rear support 5, the front connecting rod 6, the rear connecting rod 7, the lower sliding sleeve 8, the front wheel 9, the rear wheel 10, the seat rod 11, and the pull rod 13 mentioned above are all provided symmetrically on the left and right sides of the folding stroller. The front supports 4 on the left and right sides are fixedly connected a front transverse rod 15 therebetween, the rear supports 5 on the left and right sides are fixedly connected a rear transverse rod 14 therebetween, and front portions of the seat rods 11 are rotatably connected to the rear transverse rod 14.

In a more preferred implementation, the above-mentioned upper push rod 1, push rod 2, upper connecting rod 3, front support 4, and rear support 5 are similar in length to make the frame squarer and flatter after being folded.

In a more preferred implementation, when the frame is in the folded state, in order to enable the folding stroller to stand on its own, while the front wheels 9 and the rear wheels 10 are in contact with the ground, at least one rod of the frame is in contact with the ground to play an auxiliary supporting role, so that the folding stroller can stand on its own stably. In this embodiment, in the folded state, the upper connecting rods 3 are in contact with the ground, and the upper push rods 1 or the push rods 2 may also be used to contact the ground.

The locking device can adopt the structure in the conventional art, the unlocking operating member of the locking device in this embodiment is provided on the push handle above the upper push rod 1, and since the locking device is not the key technical points of the present application, it is not shown in the drawings and will not be described in detail here.

A first wheel turnover mechanism is provided between the front support 4 and the front wheel 9, a second wheel turnover mechanism is provided between the rear support 5 and the rear wheel 10, and the first wheel turnover mechanism and the second wheel turnover mechanism both act to turn over the front wheel 9 and the rear wheel 10 respectively during the transition of the frame from the unfolded state to the folded state.

The first turnover mechanism and the second turnover mechanism may be different, or may be the same, and in this embodiment, the two have substantially the same structure, and are symmetrically arranged on the front and rear sides of the folding stroller.

Take the first wheel turnover mechanism as an example to illustrate the structure, the first wheel turnover mechanism comprises a front wheel connector 16a capable of being pivotally connected with the front support 4 and having a front spiral groove 17a, a front drive rod 18a of which an end portion is slidably connected with the front spiral groove 17a, and a first front connecting piece 19a connected with the front drive rod 18a, the first front connecting piece 19a is rotatably connected with the front connecting rod 6, and the front wheel 9 is mounted on the front wheel connector 16a. The front drive rod 18a and the first front connecting piece 19a may be rotatably connected or may be fixedly connected, and when the two are fixedly connected, the front drive rod 18a will simultaneously rotate around its own axis while sliding along the front spiral groove 17a.

Specifically, there are two front wheel connectors 16a which are symmetrically connected to the bottoms of the two front supports 4 on the left and right sides of the folding stroller, respectively, and the two front wheels 9 are respectively mounted on the front wheel connectors 16a on the same side. There may be designed two front drive rods 18a on the left and right sides of the folding stroller, or as in this embodiment, there is one front drive rod 18a of which the left and right end portions are slidably connected with the front spiral grooves 17a of the front wheel connectors 16a on the left and right sides, respectively.

Correspondingly, there are two first front connecting pieces 19a which are symmetrically arranged on the left and right sides of the folding stroller, and preferably, the two first front connecting pieces 19a are fixedly connected with each other by a front transverse connecting piece 22a, and in the embodiment, the front transverse connecting piece 22a is the front footrest of the folding stroller, and when the child rides on the seat plate 12, the front footrest can be used for the child to put his feet on it.

In this embodiment, a second front connecting piece 20a is fixed on the front connecting rod 6, the second front connecting piece 20a is connected to the front portion of the front connecting piece 6, and the first front connecting piece 19a is rotatably connected to the second front connecting piece 20a.

In a more preferred implementation, a lower portion of the front spiral groove 17a is in communication with a front fixing groove 21a, and when the frame is in the unfolded state, the end portion of the front drive rod 18a slides from the front spiral groove 17a into and connected within the front fixing groove 21a so as to keep the axle of the front wheel 9 extending along the left-right direction.

The second wheel turnover mechanism in this embodiment comprises a rear wheel connector 16b capable of being pivotally connected with the rear support 5 and having a rear spiral groove (not shown in the figures), a rear drive rod 18b of which an end portion is slidably connected with the rear spiral groove, and a first rear connecting piece 19b connected with the rear drive rod 18b, the first rear connecting piece 19b is rotatably connected with the rear connecting rod 7, and the rear wheel 10 is mounted on the rear wheel connector 16b. The rear drive rod 18b and the first rear connecting piece 19b may be rotatably connected, or may be fixedly connected.

Specifically, there are two rear wheel connectors 16b which are symmetrically connected to the bottoms of the two rear supports 5 on the left and right sides of the folding stroller, respectively, and the two rear wheels 9 are respectively mounted on the rear wheel connectors 16b on the same side. There may be designed two rear drive rods 18b on the left and right sides of the folding stroller, or as in this embodiment, there is one rear drive rod 18b of which the left and right end portions are slidably connected with the rear spiral grooves of the rear wheel connectors 16b on the left and right sides, respectively. Correspondingly, there are two first rear connecting pieces 19b which are arranged symmetrically on the left and right sides of the folding stroller. In this embodiment, the rear connecting rod 7 is fixed a second rear connecting piece 20b thereon, the second rear connecting piece 20b is connected to the rear portion of the rear connecting rod 7, and the first rear connecting piece 19b is rotatably connected to the second rear connecting piece 20b, and the second wheel turnover mechanism in this embodiment is different from the first wheel turnover mechanism in that there is no transverse connecting piece between the two second connecting pieces 20b.

In a more preferred implementation, a lower portion of the rear spiral groove is in communication with a rear fixing groove (not shown in the figures), and when the frame is in the unfolded state, the end portion of the rear drive rod 18b slides from the rear spiral groove into and connected within the rear fixing groove so as to keep the axle of the rear wheel 10 extending along the left-right direction.

Working principle of the stroller folding:

When folding the stroller, the locking device is unlocked, the upper push rods 1 are turned forward and downward to drive the push rods 2 and the upper connecting rods 3 to move downward and move closer to the rear supports 5, to fold the first four-bar linkages, and move the upper push rods 1 and the push rods 2 closer together from the rear of the rear supports 5 toward the rear supports 5. When the first four-bar linkages are folded, the seat rods 11 and the pull rods 13 are driven to rotate, and the seat plate 12 slides backward along the seat rods 11. Since the lower ends of the upper push rods 1 are rotated backwards, the upper ends of the upper connecting rods 3 are driven to rotate backwards, so that the lower ends of the upper connecting rods 3 are rotated forward, so that the lower sliding sleeves 8 slide forward along the rear connecting rods 7, thereby causing the front portions of the rear connecting rods 7 to rotate upward to move closer to the rear supports 5, and the crank-slider mechanisms are thus linked and folded. Driven by the push rods 2 and the rear connecting rods 7, the front supports 4 and the front connecting rods 6 are rotated to move closer to the rear supports 5, and the second four-bar linkages are thus linked and folded.

When the front connecting rods 3 are rotated, the front connecting rods 6 drive the first front connecting pieces 19a to rotate through the second front connecting pieces 20a, thereby driving the front driving rods 18a to move upward, and the end portions of the front driving rods 18a are disengaged from the front fixing grooves 21a, enter the front spiral grooves 17a and slide upward along the front spiral grooves 17a, so that the front wheel connectors 16a are pivoted relative to the front supports 4, to drive the front wheel connectors 16a to turn over 90°, so that the axles of the front wheels 9 extend in the front-rear direction, and the front wheels 9 are located between the front supports 4 on both sides.

When the rear connecting rods 3 are rotated, the rear connecting rods 7 drive the first rear connecting pieces 19b to rotate through the first rear connecting pieces 20b, thereby driving the rear driving rods 18b to move upward, and the end portions of the rear driving rods 18b are disengaged from the rear fixing grooves, enter the rear spiral grooves and slide upward along the rear spiral grooves, so that the rear wheel connectors 16b are pivoted relative to the rear supports 5, to drive the rear wheel connectors 16b to turn over 90°, so that the axles of the rear wheels 10 extend in the front-rear direction, and the rear wheels 10 are located between the rear supports 5 on both sides.

Until all parts are close to each other, the whole stroller is folded.

Embodiment 2

Figure 9:
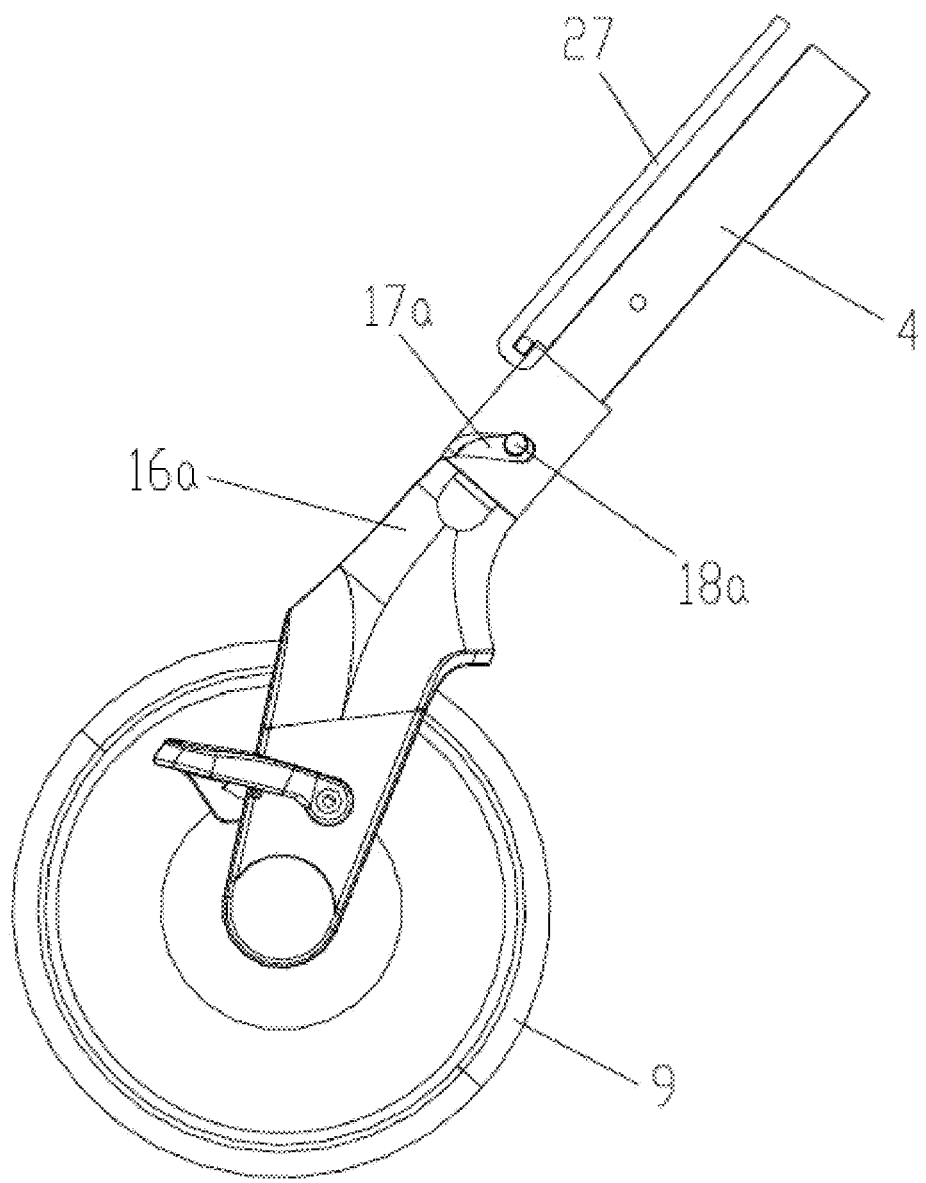
FIG. 9 is a side structure diagram of the first wheel turnover structure or the second wheel turnover structure in Embodiment 2.
Figure 10:
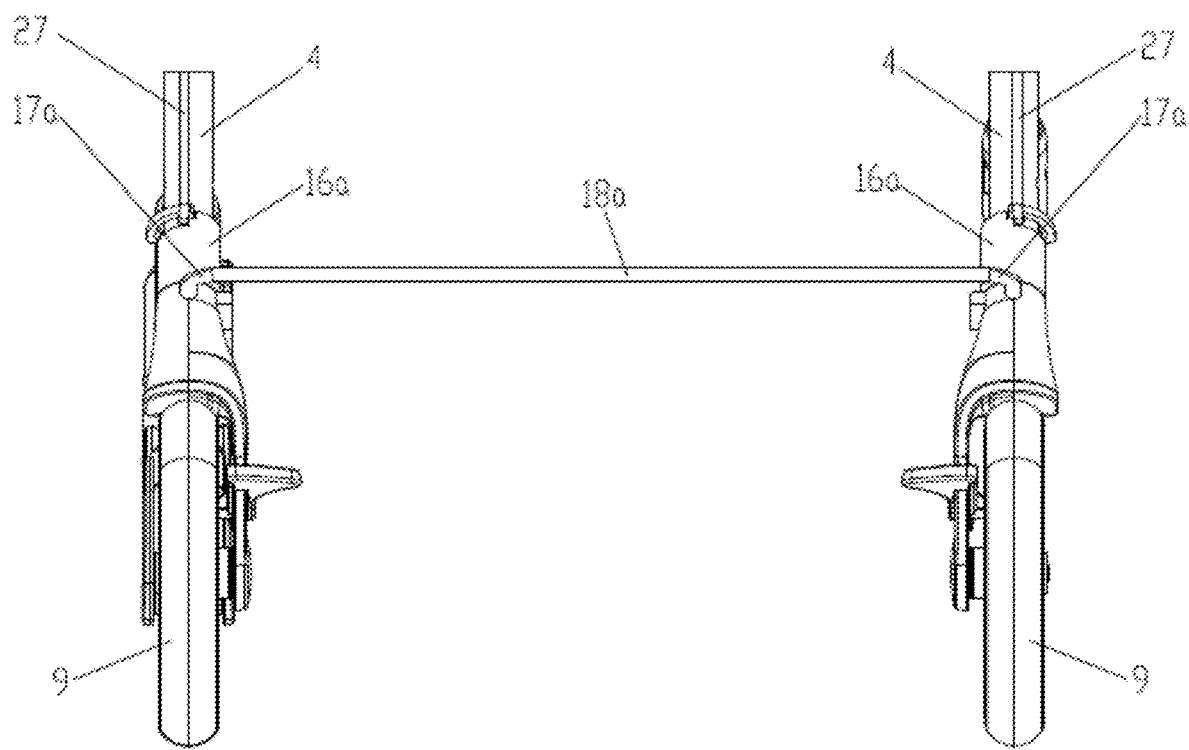
FIG. 10 is a front structure diagram of the first wheel turnover structure or the second wheel turnover structure in Embodiment 2.
Figure 11:
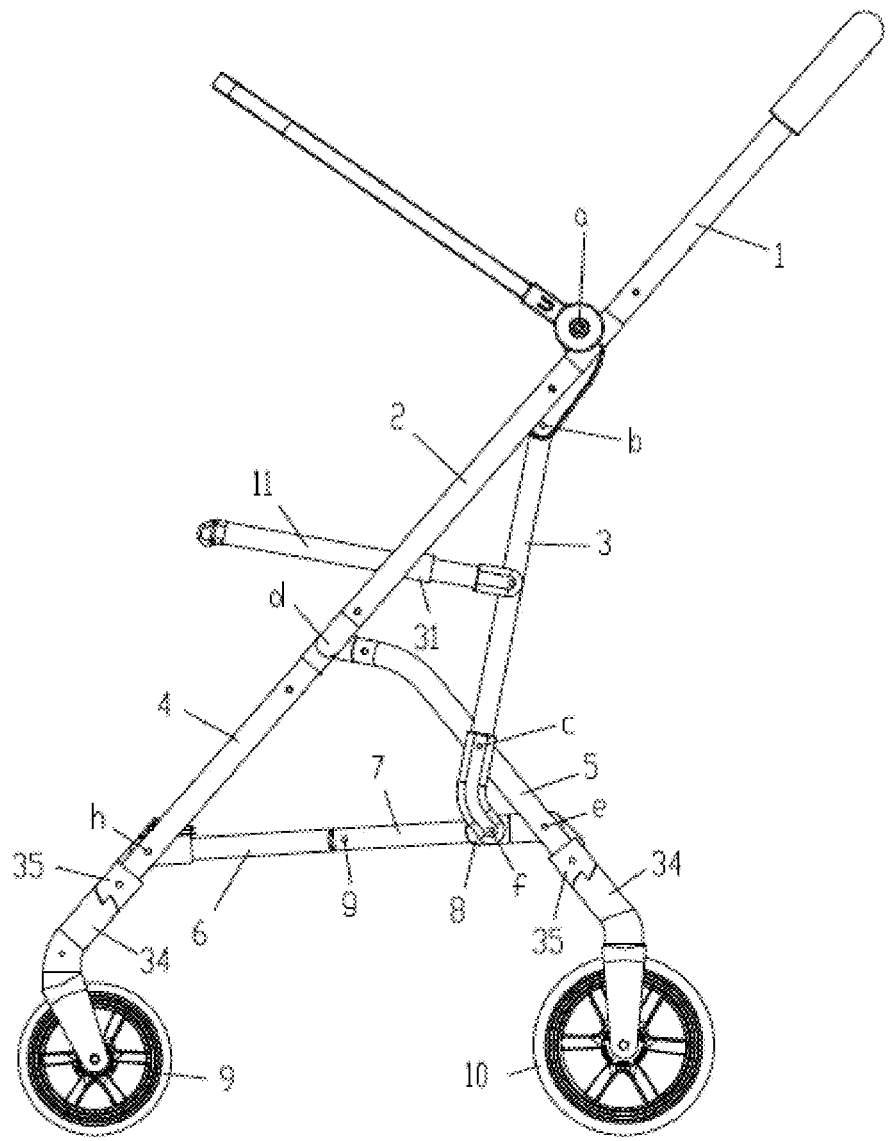
FIG. 11 is a side structure diagram of the folding stroller in the unfolded state in Embodiment 3.
Figure 12:
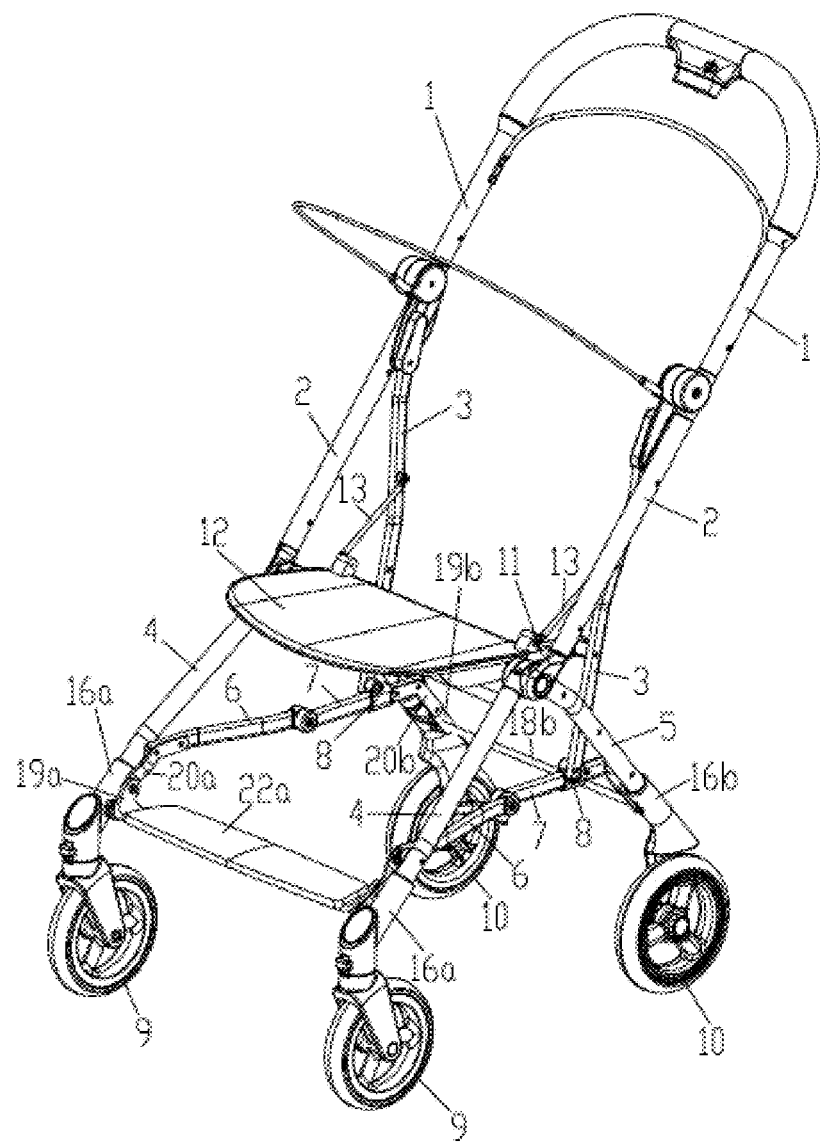
FIG. 12 is a three-dimensional structure diagram of the folding stroller in the unfolded state in Embodiment 3.
Figure 13:
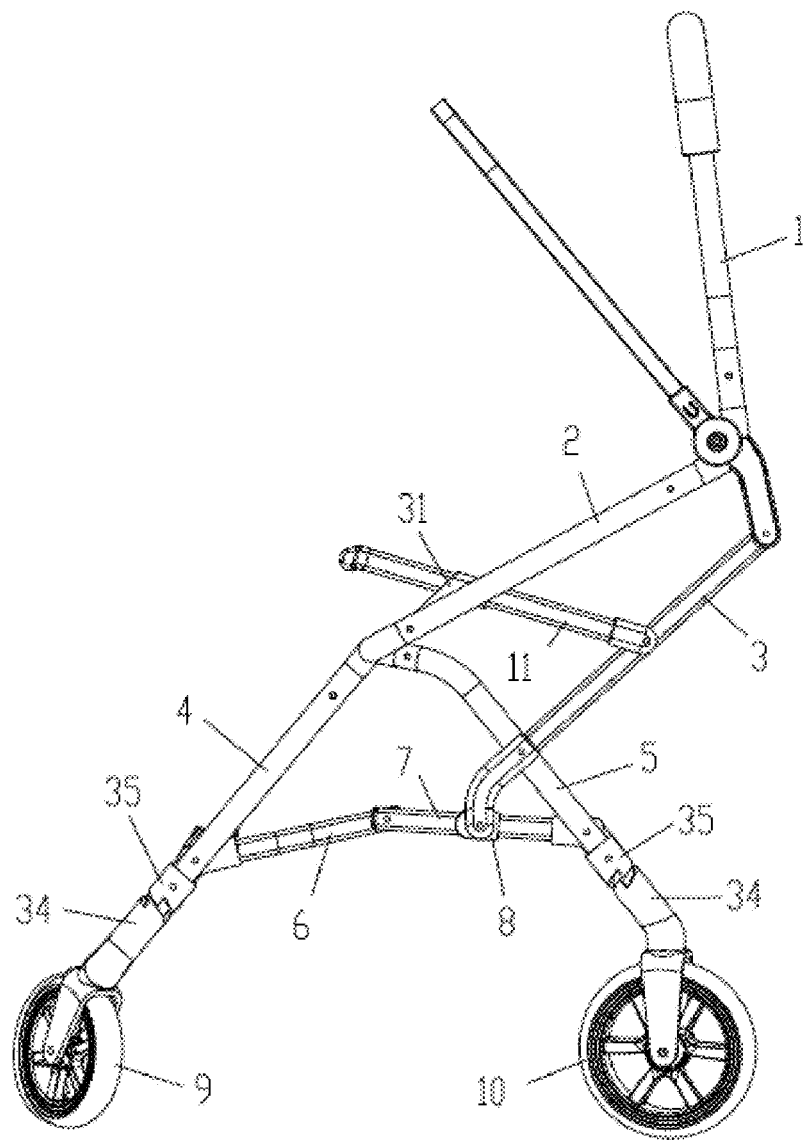
FIG. 13 is a side structure diagram of the folding stroller in Embodiment 3 during the folding process.
Figure 14:
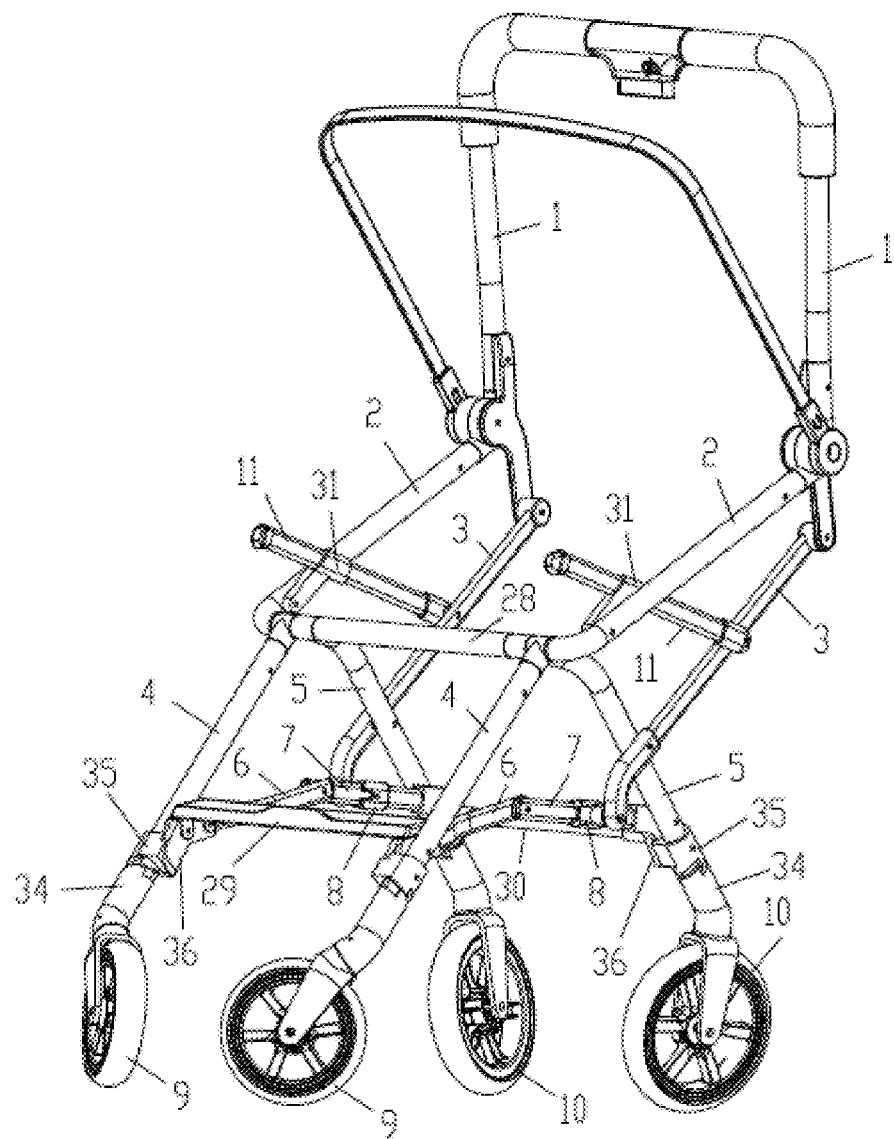
FIG. 14 is a three-dimensional structure diagram of the folding stroller in Embodiment 3 during the folding process.
Figure 15:
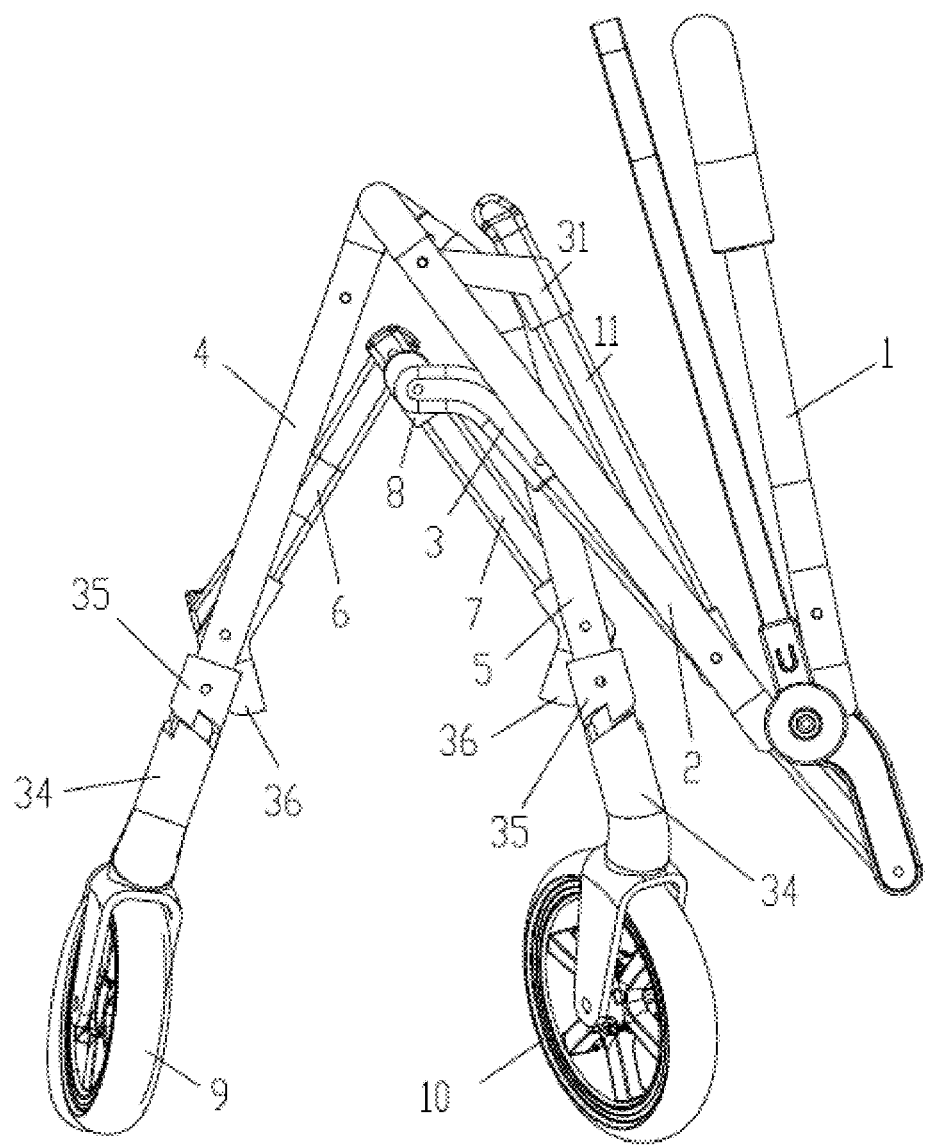
FIG. 15 is a side structure diagram of the folding stroller in Embodiment 3 when it is further folded compared to FIG. 13.
Figure 16:
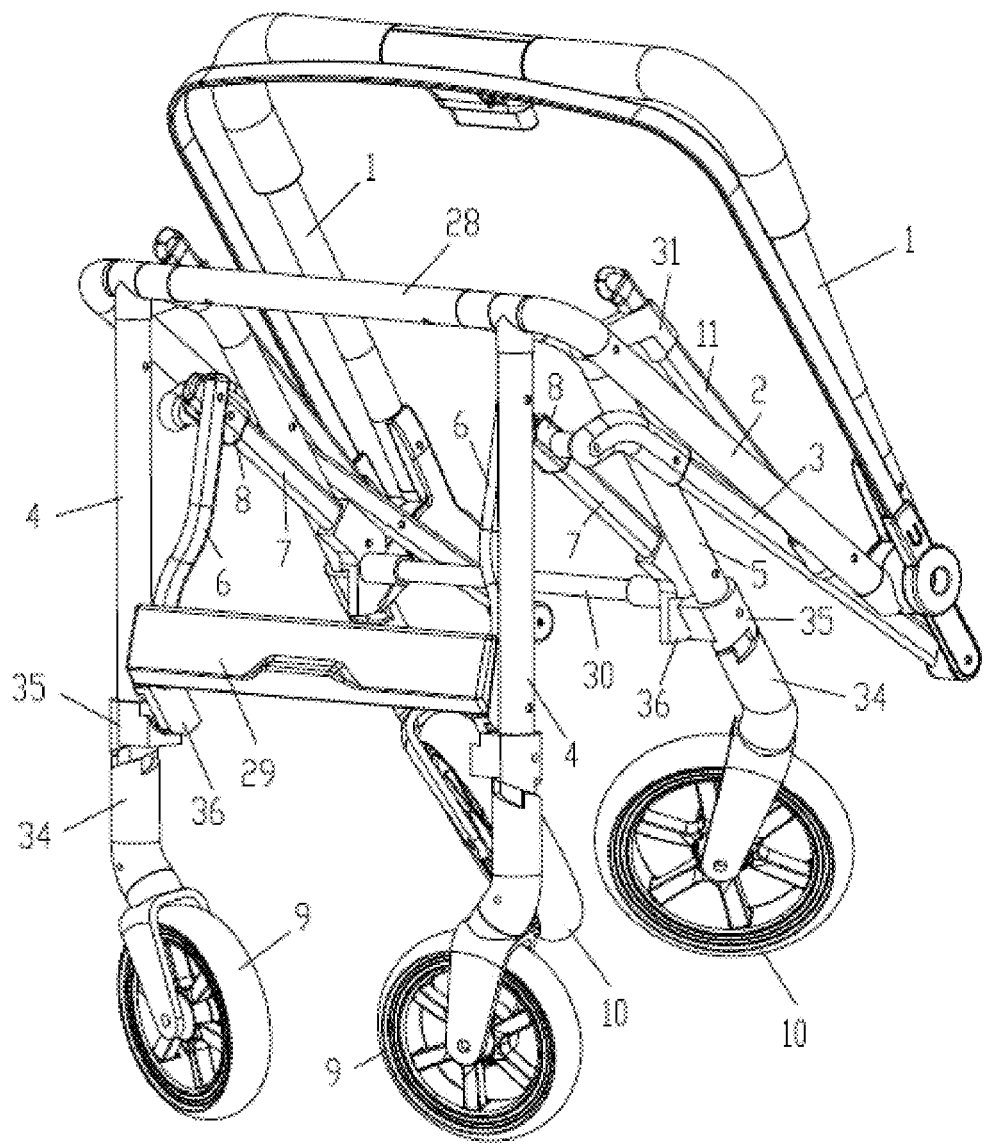
FIG. 16 is a three-dimensional structure diagram of the folding stroller in Embodiment 3 when it is further folded compared to FIG. 14.
Figure 17:
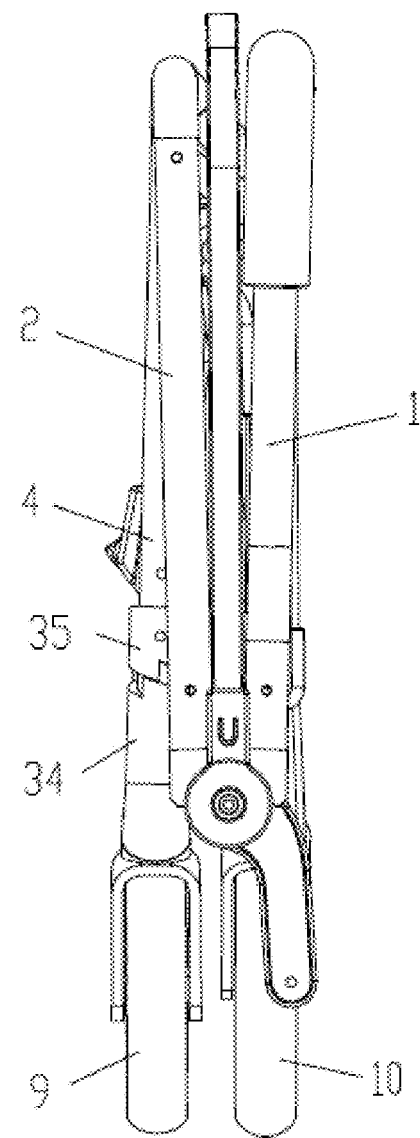
FIG. 17 is a side structure diagram of the folding stroller in the folded state in Embodiment 3.
Figure 18:
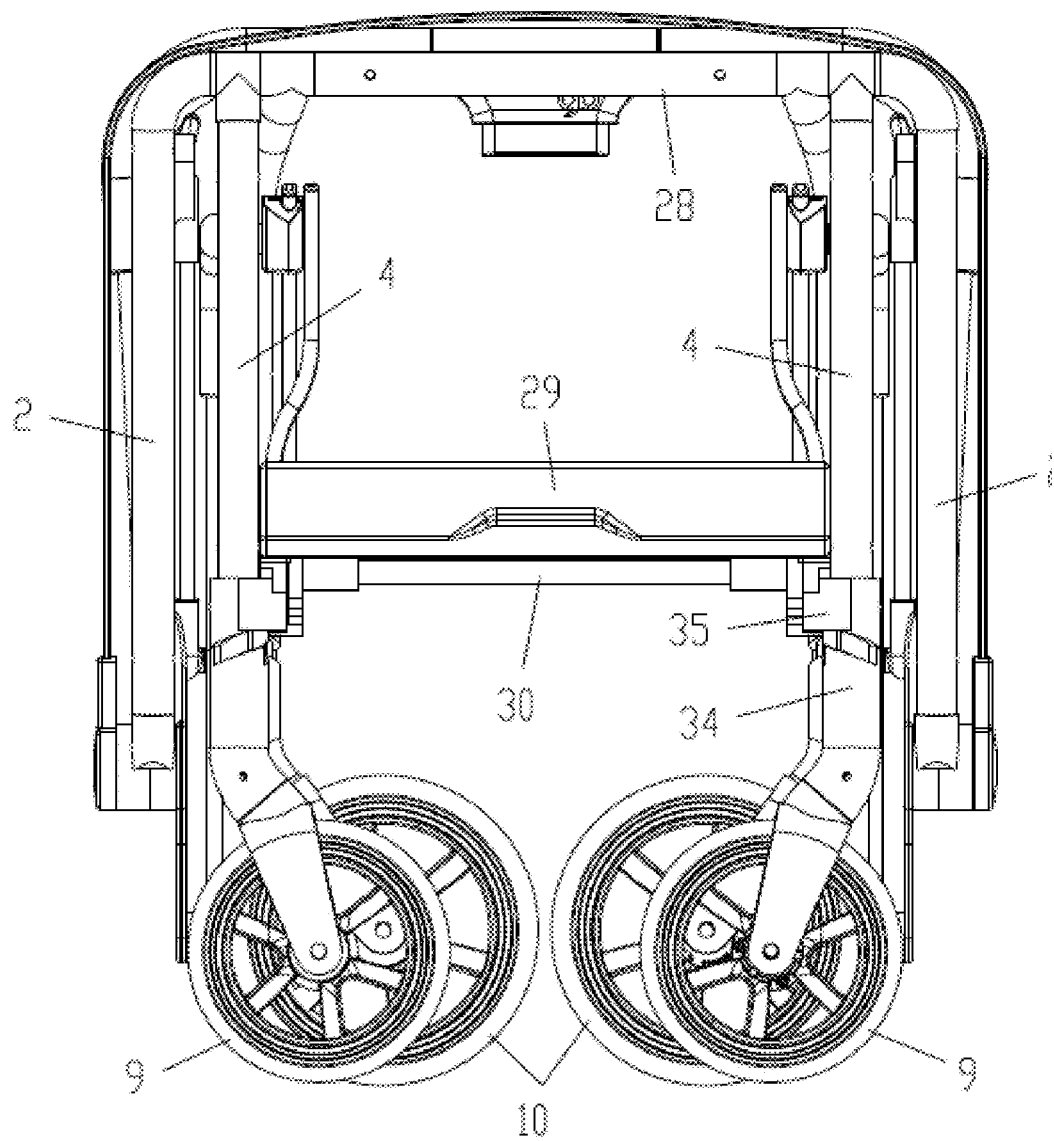
FIG. 18 is a three-dimensional structure diagram of the folding stroller in the folded state in Embodiment 3.
Figure 19:
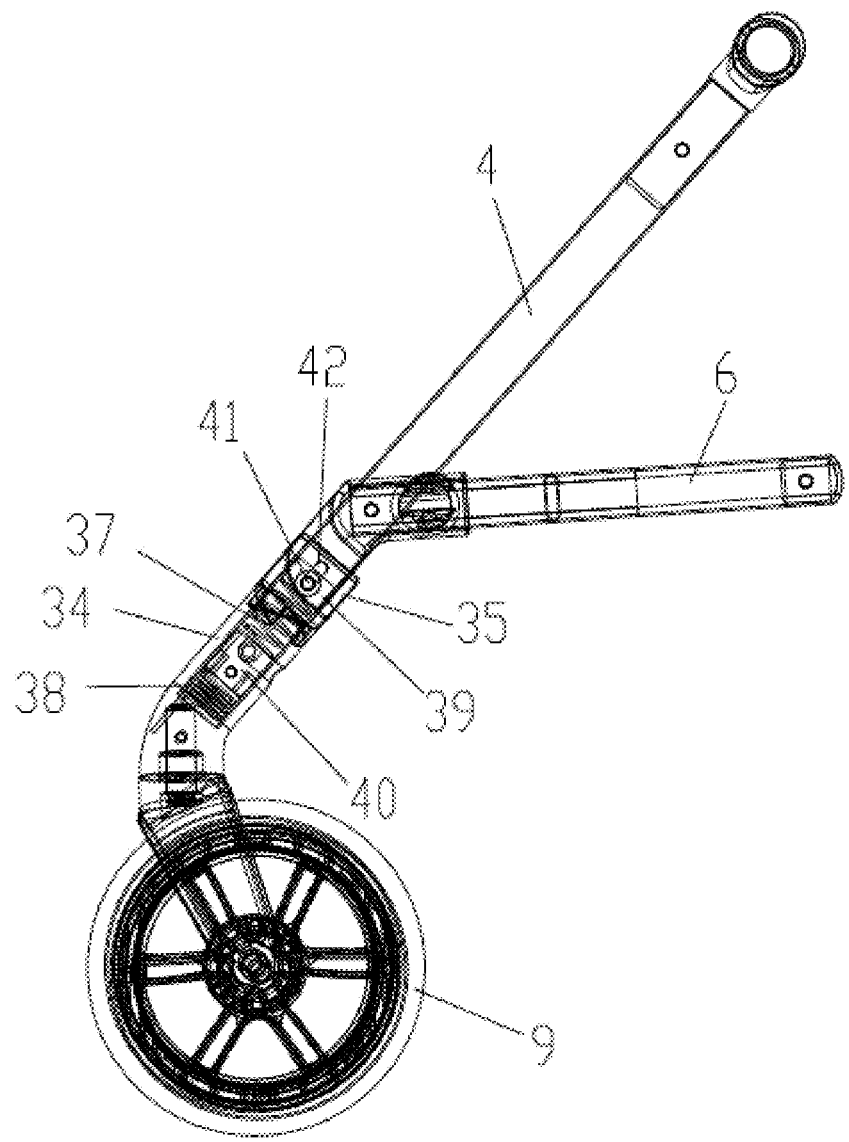
FIG. 19 is a perspective structure diagram of the wheel turnover structure of the folding stroller in Embodiment 3.
Figure 20:
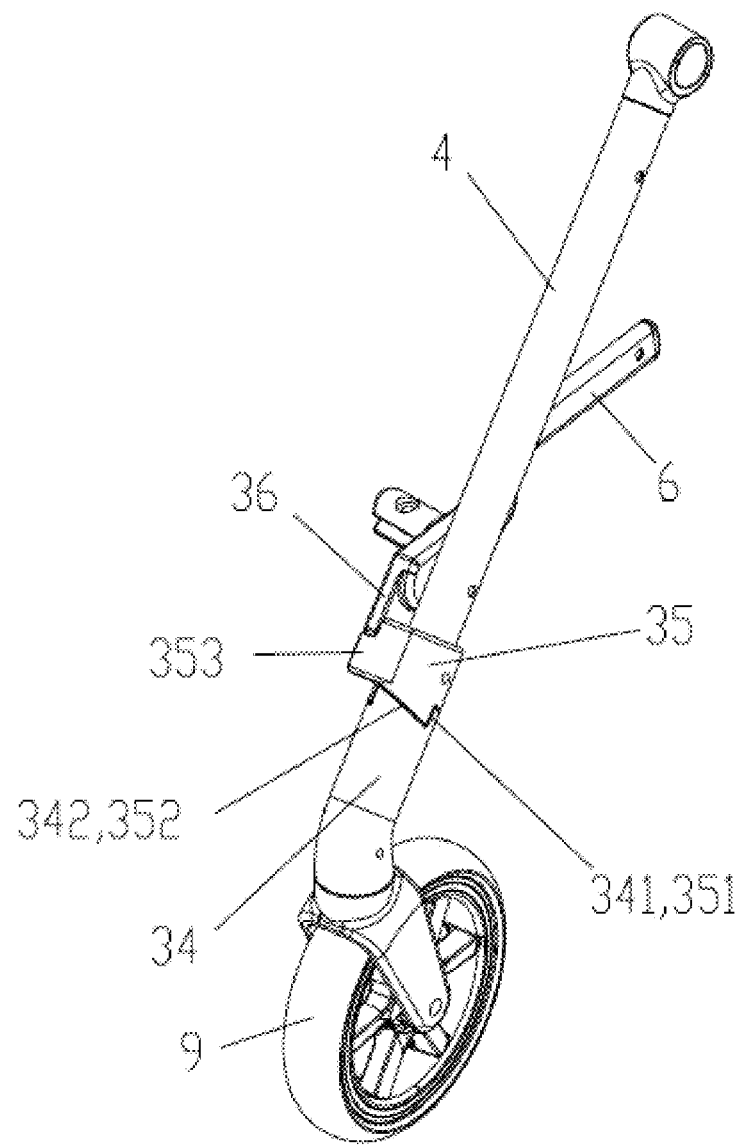
FIG. 20 is a three-dimensional structure diagram of the wheel turnover structure of the folding stroller in Embodiment 3, at this moment, the folding stroller is in the unfolded state, the wheel turnover mechanism is locked, and the wheels are not turned.
Figure 21:
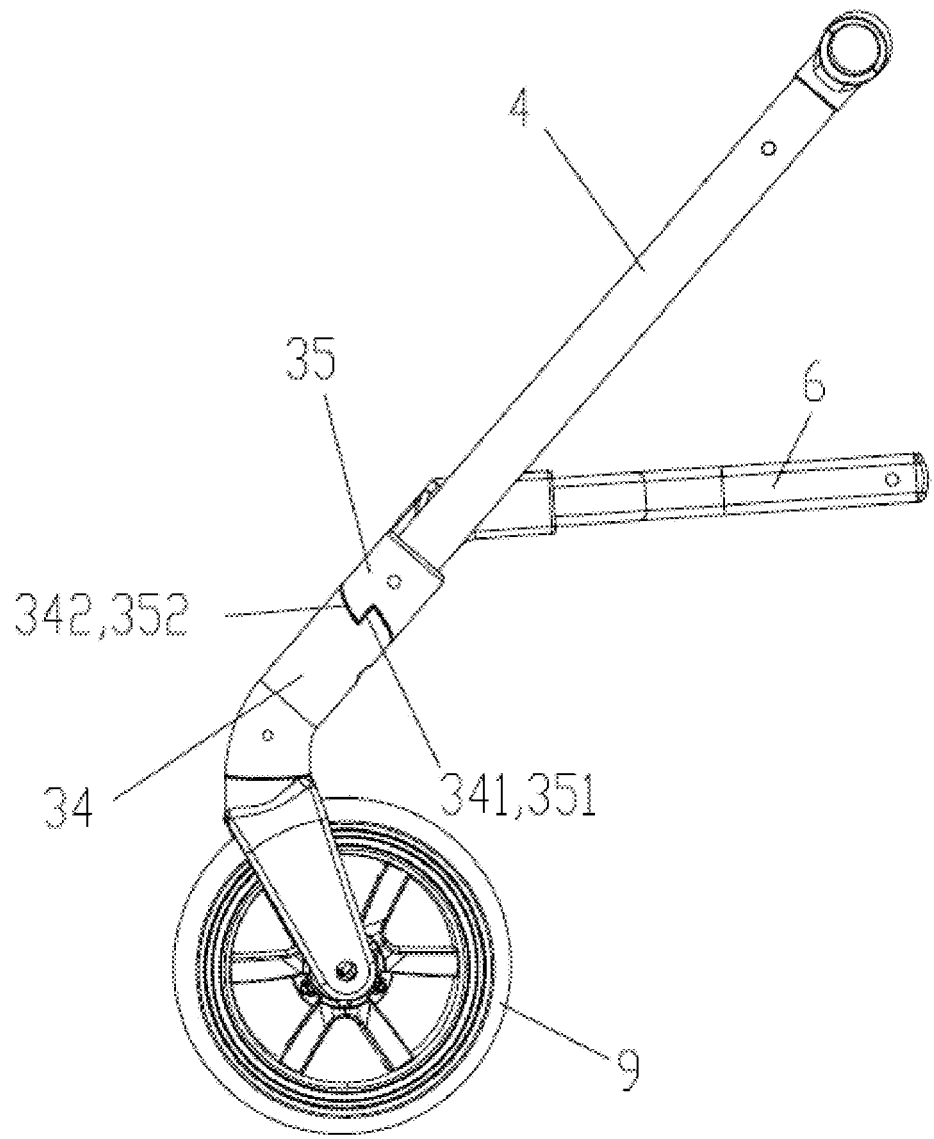
FIG. 21 is a side structure diagram of FIG. 20.
Figure 22:
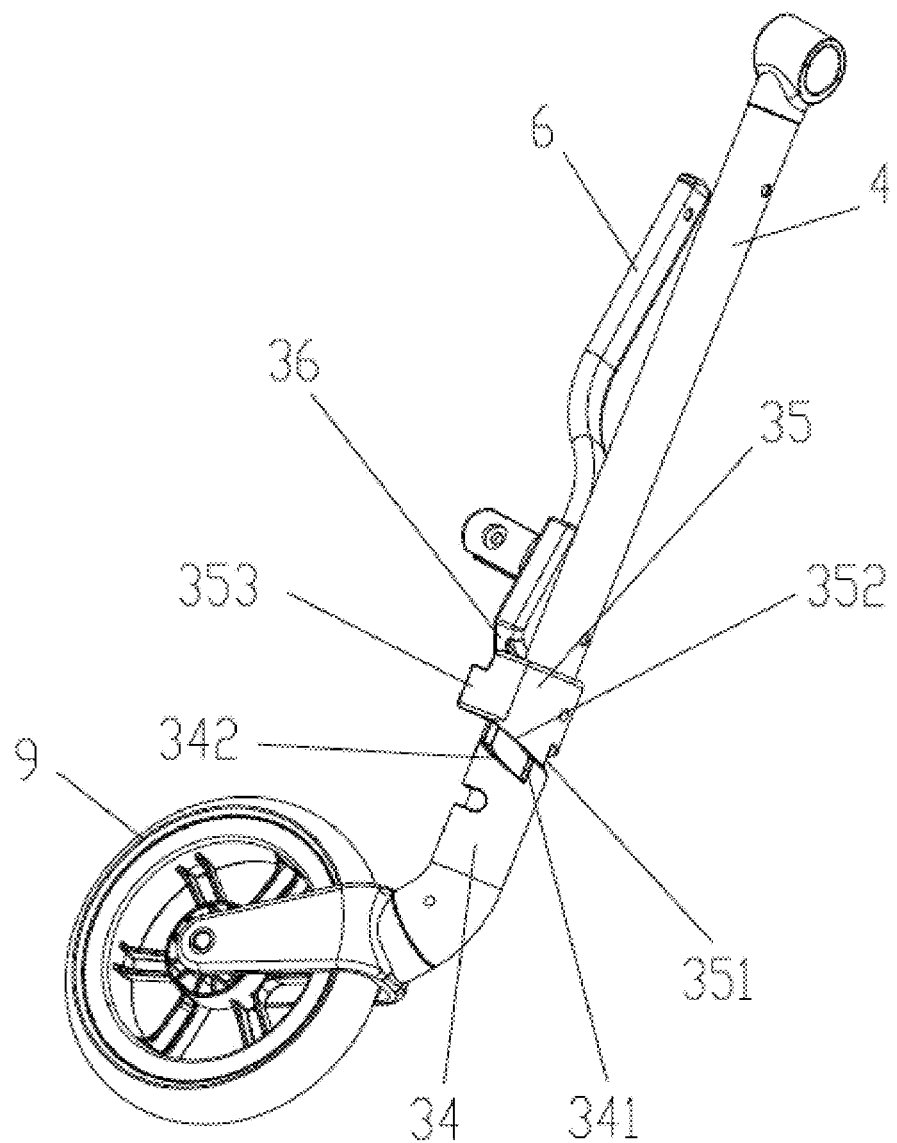
FIG. 22 is a three-dimensional structure diagram of the wheel turnover structure in Embodiment 3, at this moment, the folding stroller is in the folded state, the wheel turnover mechanism is unlocked, and the wheels are turned over.
Figure 23:
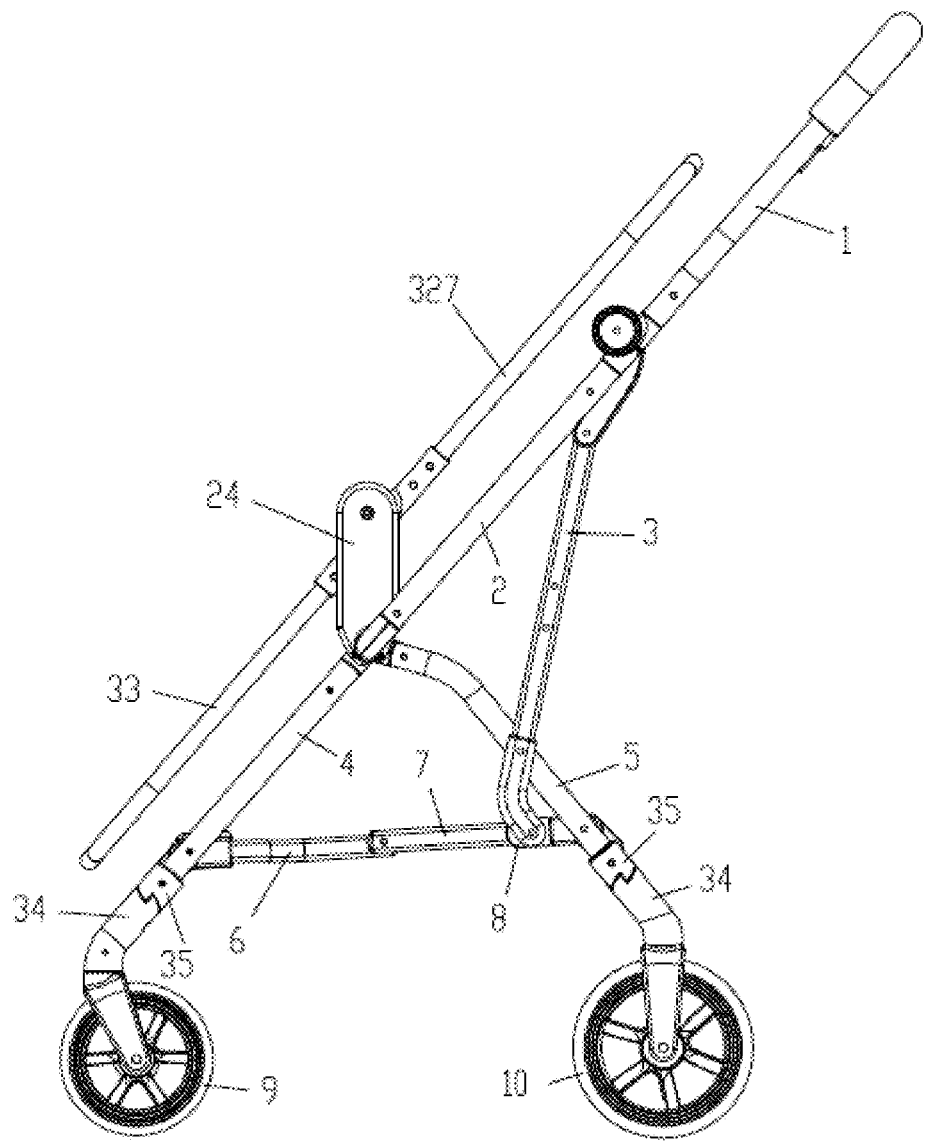
FIG. 23 is a side structure diagram of the folding stroller in the unfolded state in Embodiment 4.
Figure 24:
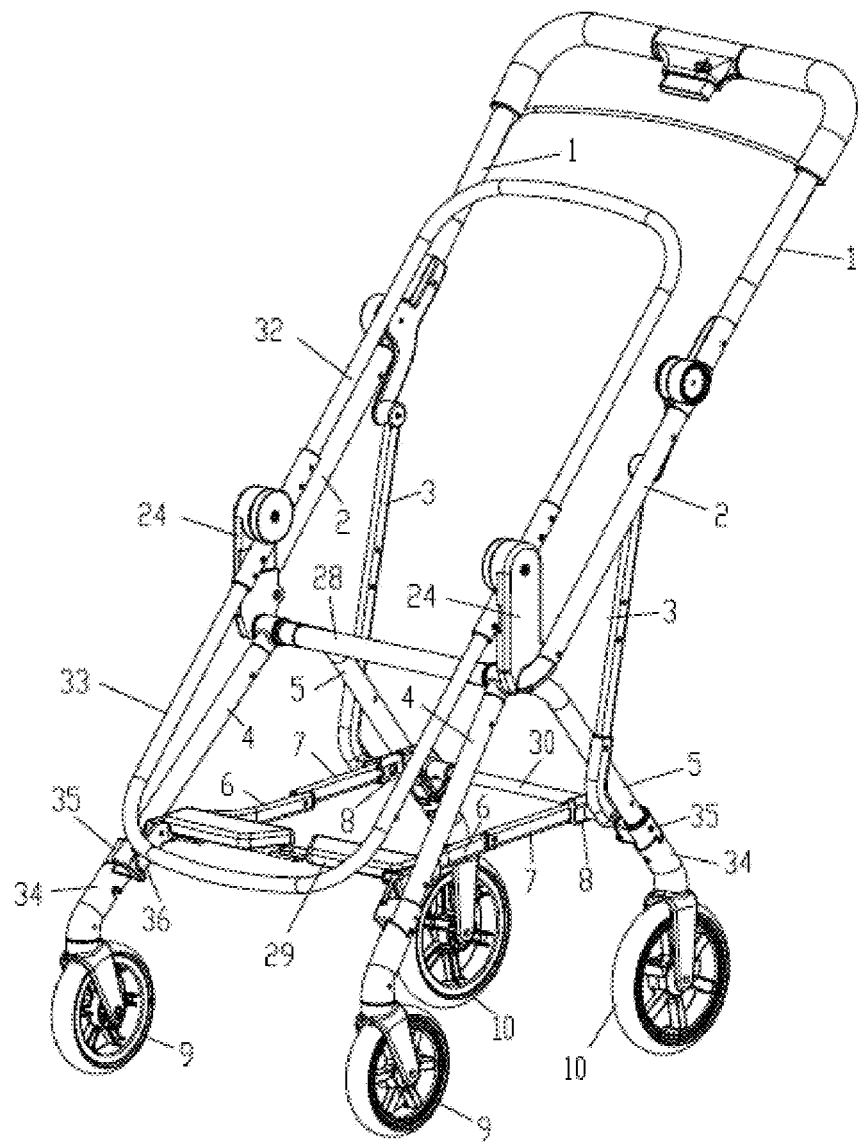
FIG. 24 is a three-dimensional structure diagram of the folding stroller in the unfolded state in Embodiment 4.
Figure 25:
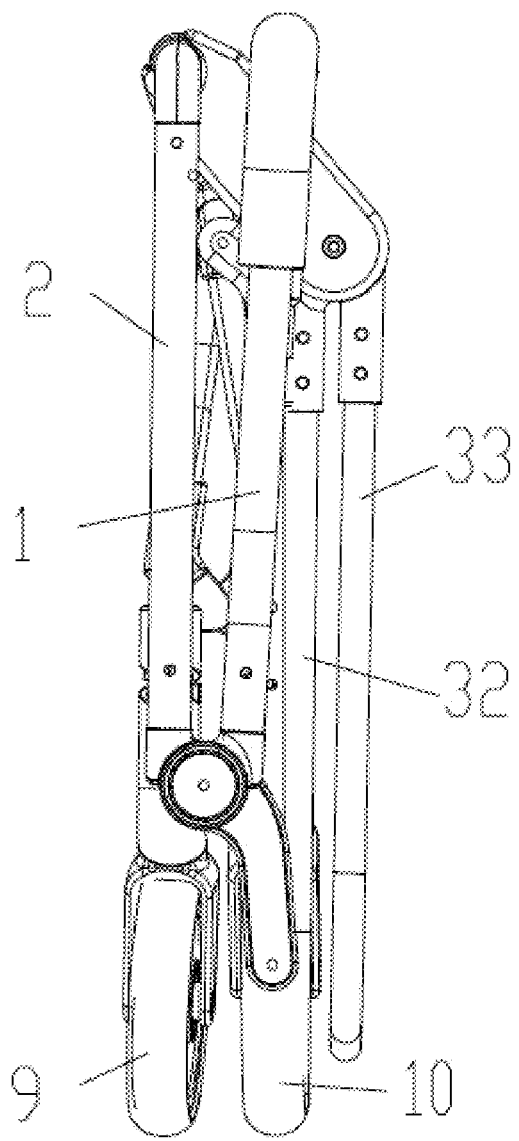
FIG. 25 is a side structure diagram of the folding stroller in the folded state in Embodiment 4.
Figure 26:
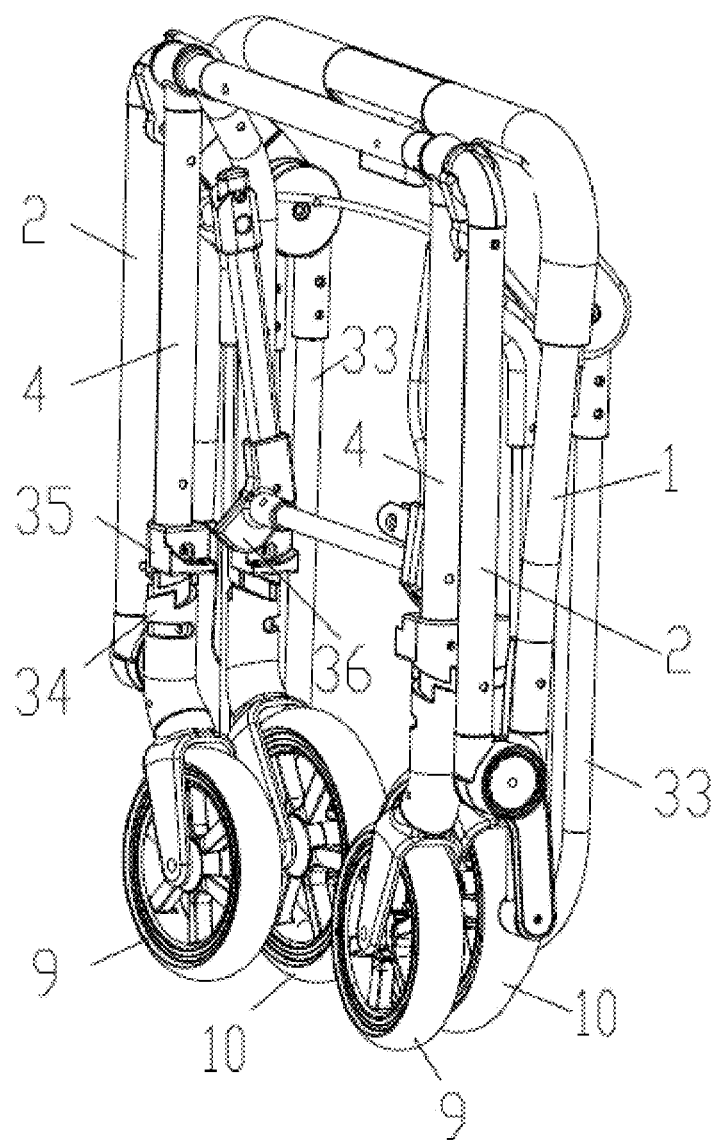
FIG. 26 is a three-dimensional structure diagram of the folding stroller in the folded state in Embodiment 4.

Referring to FIG. 9 and FIG. 10, this embodiment provides another structure of the first wheel turnover mechanisms and the second wheel turnover mechanisms that are different from the structure of Embodiment 1.

The first wheel turnover mechanisms in this embodiment comprise wheel connectors 16a capable of being pivotally and slidably connected with the front supports 4 and having spiral grooves 17a, a drive rod 18a provided on the front supports 4 and capable of being slidably connected with the spiral grooves 17a, and drive parts 27 driven to move by folding the frame and capable of driving the wheel connectors 16a to slide, and the front wheels 9 are mounted toon the front wheel connectors 16a. The front drive rod 18a in this embodiment is fixedly arranged on the front supports 4, and in this embodiment, there may be designed two front drive rods 18a on the left and right sides of the folding stroller, or there may be only one of which the left and right end portions are fixedly connected with the front supports 4 on the left and right sides, respectively. The drive parts 27 preferably adopt a flexible component, such as a traction cable, and the drive parts 27 can also adopt a rigid component, then, further, spiral grooves are preferably provided on the front supports 4, and the drive parts 27 can be slidably connected with these spiral grooves, to avoid interference between the drive parts 27 and the front supports 4 when the front wheel connectors 16a are pivoted. The drive parts 27 shown in FIG. 9 and FIG. 10 are arranged on the outside of the front support 4, and may also be arranged on the inside of the front supports 4 to make the appearance of the stroller more concise. The first wheel turnover mechanism in this embodiment is less restricted by the frame structure, and can be applied to more types of frame.

Similar to Embodiment 1, the first turnover mechanism and the second turnover mechanism may be different, or may be the same, and in this embodiment, the two have substantially the same structure, and are symmetrically arranged on the front and rear sides of the folding stroller. The specific structure of the second wheel turnover mechanism will not be repeated here.

Working principle of the stroller folding:

When folding the stroller, the locking device is unlocked, and the folding operation of the frame is the same as in Embodiment 1.

When being folded, the frame drives the drive parts 27 arranged on the front side of the stroller to move upward, the drive parts 27 pull the front wheel connectors 16a to move upward, during the upward movement of the front wheel connectors 16a, and under the interaction between the front drive rods 18a and the front spiral grooves 17a, the front wheel connectors 16a are pivoted relative to the front supports 4, to drive the front wheel connectors 16a to turn over 90°, so that the axles of the front wheels 9 extend in the front-rear direction, and the front wheels 9 are located between the front supports 4 on both sides.

When being folded, the frame drives the drive parts 27 arranged on the rear side of the stroller to move upward, the drive parts 27 pull the rear wheel connectors 16b to move upward, during the upward movement of the rear wheel connectors 16b, and under the interaction between the rear drive rods 18b and the rear spiral grooves 17b, the rear wheel connectors 16b are pivoted relative to the rear supports 5, to drive the rear wheel connectors 16b to turn over 90°, so that the axles of the rear wheels 10 extend in the front-rear direction, and the rear wheels 10 are located between the rear supports 5 on both sides.;

Until all parts are close to each other, the whole stroller is folded.

Embodiment 3

Referring to FIG. 11 to FIG. 18, the folding stroller in this embodiment is similar to Embodiment 1, the frame thereof also comprises the upper push rods 1, the push rods 2, the upper connecting rods 3, the front supports 4, the rear supports 5, the front connecting rods 6, the rear connecting rods 7, the lower sliding sleeves 8, and the seat rods 11, and the connection relationship among the above-mentioned components are the same as in Embodiment 1.

In this embodiment, upper sliding sleeves 31 are slidably connected to the seat rods 11 along the length directions of the seat rods 11 and are rotatably connected to the push rods 2.

In a more preferred implementation, an upper transverse connecting rod 28 is connected between the lower portions of the push rods 2 on the left and right sides, and the shaft d coincides with the axis of the upper transverse connecting rod 28, and the upper portions of the front supports 4 and the upper portions of the rear supports 5 are rotatably connected to the upper transverse rod 13. A front transverse connecting rod 29 is connected between the front supports 4 on the left and right sides, and a rear transverse connecting rod 30 is connected between the rear supports 5 on the left and right sides.

Working principle of the stroller folding:

When folding the stroller, the operation is similar to that of Embodiment 1: the locking device is unlocked, the upper push rods 1 are turned forward and downward to drive the push rods 2 and the upper connecting rods 3 to move downward and move closer to the rear supports 5, to fold the first four-bar linkages, and move the upper push rods 1 and the push rods 2 closer together from the rear of the rear supports 5 toward the rear supports 5. When the first four-bar linkages are folded, the seat rods 11 are driven to rotate, and the upper sliding sleeves 31 slide forward along the seat rods 11. At the same time, the upper sliding sleeves 31 are rotated with respect to the push rods 2. Since the lower ends of the upper push rods 1 are rotated backwards, the upper ends of the upper connecting rods 3 are driven to rotate backwards, so that the lower ends of the upper connecting rods 3 are rotated forward, so that the lower sliding sleeves 8 slide forward along the rear connecting rods 7, thereby causing the front portions of the rear connecting rods 7 to rotate upwards to move closer to the rear supports 5, and the crank-slider mechanisms are thus linked and folded. Driven by the push rods 2 and the rear connecting rods 7, the front supports 4 and the front connecting rods 6 are rotated to move closer to the rear supports 5, and the second four-bar linkages are thus linked and folded. Until all parts are close to each other, the whole stroller is folded.

The folding stroller in this embodiment may adopt the wheel turnover mechanisms in Embodiments 1 and 2, or the following wheel turnover mechanism. Similar to Embodiment 1 and Embodiment 2, the first turnover mechanism and the second turnover mechanism may be different, or may be the same, and in this embodiment, the two have the same structure and are symmetrically arranged on the front and rear sides of the folding stroller, so only the first wheel turnover mechanism will be specifically described and explained.

As shown in FIG. 19 to FIG. 22, the first wheel turnover structure comprises a sliding seat 35 slidably connected to the support along the length of the support, a first elastic element 37 (a spring in this embodiment) that directly or indirectly applies force to the sliding seat 35 to cause it to slide, and a second elastic element 38 (a torsion spring in this embodiment) that applies force to a rotating seat 34 to pivot relative to the support, the front connecting rod 6 has a locking part 36 detachably abutting with the sliding seat 35, and when the locking part 36 abuts against the sliding seat 35, the direction of the force applied to the sliding seat 35 by it is opposite to that of the force applied by the first elastic element 37, specifically, the first elastic element 37 applies an upward force to the sliding seat 35 along the length of the support. The sliding seat 35 is detachably connected to the rotating seat 34, and when the sliding seat 35 is connected to the rotating seat 34, the direction of the force applied to the rotating seat 34 by it is opposite to that of the force applied by the second elastic element 38.

When the folding stroller is in the unfolded state, the locking part 36 abuts the sliding seat 35, the sliding seat 35 is connected to the rotating seat 34, and the axles of the front wheels 10 extend in the left-right direction; when the folding stroller is in the folded state, the front connecting rod 6 is rotated to disengage the locking part 36 from the sliding seat 35, the sliding seat 35 is driven by the first elastic element 37 to disengage from the rotating seat 34, and the rotating seat 34 is driven to rotate by the second elastic element 38, so that the front wheel 9 is turned until the axle of the front wheel 9 extends in the front-rear direction.

In this embodiment, the front support 4 has a tubular structure, and a second elastic element fixing seat 40 is connected inside the front support 4, the second elastic element 38 is also provided inside the front support 4, one end of the second elastic element 38 is connected with the second elastic element fixing seat 40, and the other end of the second elastic element 38 is connected with the rotating seat 34. The sliding seat 35 is slidably sleeved on the outer side of the front support 4. Further, the inner side of the front support 4 is slidably connected with an inner plug 39, and the front support 4 is provided with a waist-shaped hole 27, the inner plug 39 and the sliding seat 35 are connected via a rivet 41, and the rivet 41 is movably located in the waist-shaped hole 42. One end of the first elastic element 37 abuts against the inner plug 39, and the other end abuts against the second elastic element fixing seat 40. The sliding seat 35 has a first step 351, and the rotating seat 34 has a second step 341; when the sliding seat 35 is connected with the rotating seat 34, the first step 351 and the second step 341 are matched and abut against each other; when the sliding seat 35 and the rotating seat 34 are disengaged from each other, the first step 351 and the second step 341 are separated from each other. The sliding seat 35 has a first spiral surface 352, and the rotating seat 34 has a second spiral surface 342; during the unfolding process of the frame of the folding stroller, the first spiral surface 352 and the second spiral surface 342 are in sliding contact; when the sliding seat 35 and the rotating seat 34 are disengaged from each other, the first spiral surface 352 and the second spiral surface 342 are separated from each other. The sliding seat 35 has a protrusion 353, and when the locking part 36 abuts against the sliding seat 35, the locking part 36 abuts above the protrusion 353. The locking part 36 is provided at one end portion of the front support 4.

The working principle of the wheel turnover structure is:

When folding the stroller, the front connecting rods 6 are rotated relative to the front supports 4, the locking parts 36 are separated from the protrusions 353 of the sliding seats 35, and the resisting effect of the locking parts 36 is lost; under the push of the first elastic elements 37, the inner plugs 39 drive the sliding seats 35 to move upward and disengage from the rotating seats 34; when the resisting effect of the sliding seats 35 is lost, and driven by the second elastic elements 38, the rotating seats 34 are pivoted relative to the front supports 4, thereby driving the front wheels 9 to turn over; when opening the stroller, the front connecting rods 6 are rotated relative to the front supports 4, the locking parts 36 are in contact with the protrusions 353 of the sliding seats 35 and push them to move downward, the sliding seats 35 overcome the force of the first elastic elements 37 to move downward, the first spiral surfaces 352 and the second spiral surfaces 342 are in sliding contact with each other, and under the action of both, the sliding seats 35 can push the rotating seats 34 to overcome the forces of the second elastic elements 38 during the downward movement, and are pivoted relative to the front supports 4, thereby driving the front wheels 9 to turn over until the axles extend in the left-right direction, until the first steps 351 and the second steps 341 are in contact, and the turning and opening of the wheels is completed.

Embodiment 4

It can be seen from the schematic structure diagrams in FIG. 23 to FIG. 26 that the folding stroller in this embodiment differs from Embodiment 3 only in that: the frame is not provided with the seat rod 11 and the upper sliding sleeve 12, but is provided with a seat saddle connector 24 connected to the lower portion of the push rod 2 and a seat saddle rotatably connected with the seat saddle connector 24. The seat saddle connector 24 is connected to the lower portion of the push rod 2 and is located inside the push rod 2. The seat saddle connector 24 may be detachably plugged with the push rod 2 through a socket, or may be fixedly connected with the push rod 2.

The seat saddle in this embodiment comprises an upper seat saddle surrounding frame 32 of which a lower part is rotatably connected with the seat saddle connector 24, and a lower seat saddle surrounding frame 33 of which an upper portion is rotatably connected with the seat saddle connector 24, and the upper seat saddle surrounding frame 32 and the lower seat saddle surrounding frame 33 are located inside the push rod 2 in both the left and right directions. More preferably, the upper seat saddle surrounding frame 32 and the lower seat saddle surrounding frame 33 are connected to the inner side of the seat saddle connector 24. The upper seat saddle surrounding frame 32 and the lower seat saddle surrounding frame 18 are both U-shaped, and the two together form a closed shape.

When the frame is in the folded state, the seat saddle connector 24 is located on the upper portion of the folded frame and inside the upper push rod 1 and the push rod 2, and the upper seat saddle surrounding frame 32 and the lower seat saddle surrounding frame 33 both lean on the folded frame and extend in the same direction as that of the folded frame. The length and angle of the seat saddle connector 24 can be designed according to actual conditions, such that after the frame is folded, the upper seat saddle surrounding frame 32 and the lower seat saddle surrounding frame 33 are closer to the frame. In this embodiment, when the frame is in the unfolded state, the seat saddle connector 24 is vertically arranged, the upper seat saddle surrounding frame 32 and the lower seat saddle surrounding frame 33 are located on the upper front of the push rod 2 and the front support 4, and the upper seat saddle surrounding frame 32 and the lower seat saddle surrounding frame 18 extend in the same direction as the upper push rod 1, the push rod 2, and the front support 4.

The lengths of the upper seat saddle surrounding frame 32 and the lower seat saddle surrounding frame 33 are close to the lengths of the upper push rod 1, the push rod 2, the upper connecting rod 3, the front support 4, and the rear support 5 mentioned above, so that the frame can be squarer and flatter after being folded.

Working principle of the stroller folding:

The folding principle is basically the same as that in Embodiment 3, and during the folding process of the frame, the rotation of the push rod 2 drives the seat saddle connector 24 to turn backward, so that the upper seat saddle surrounding frame 32 and the lower seat saddle surrounding frame 33 are turned backward to move closer to the rear support 5. Until all parts are close to each other, the whole stroller is folded.

Embodiment 5

Figure 27:
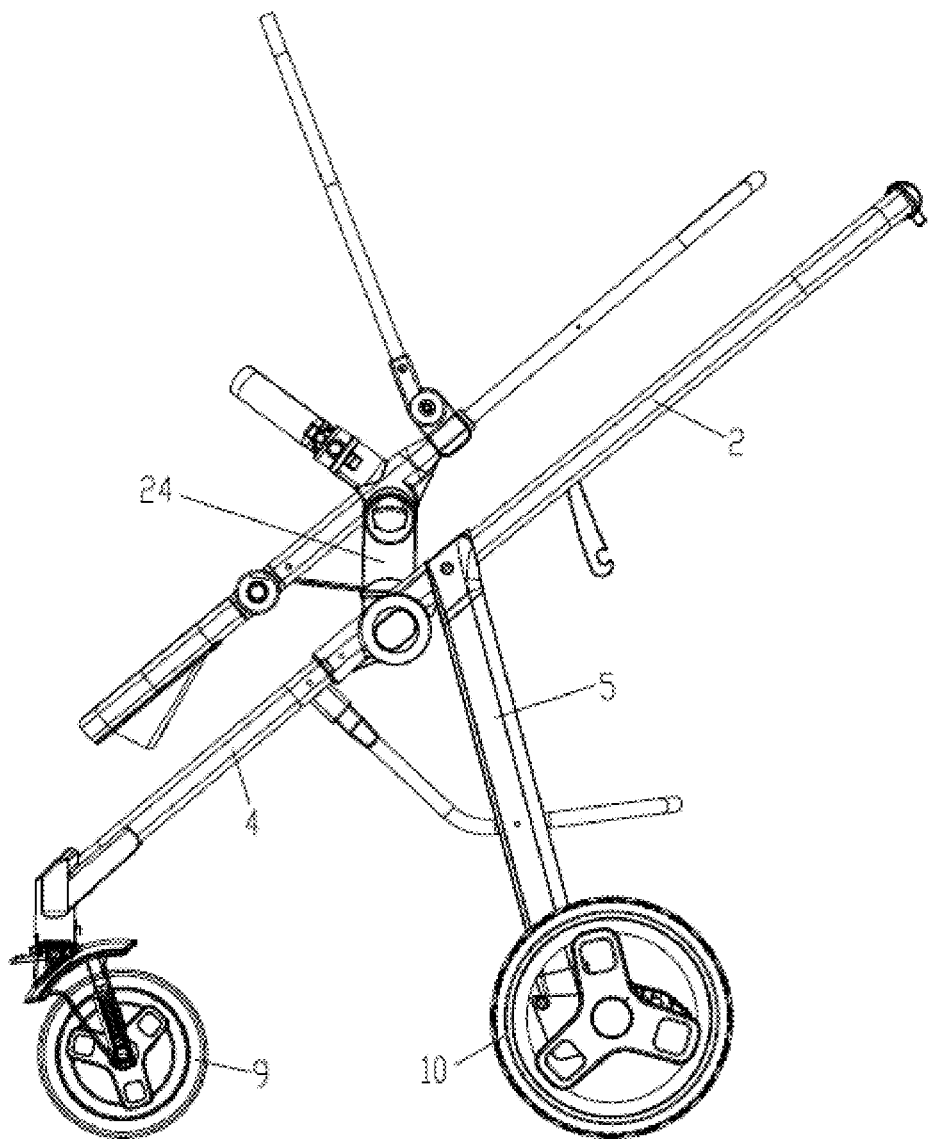
FIG. 27 is a schematic structure diagram of the folding stroller in Embodiment 5.

Referring to FIG. 27, this embodiment provides a frame structure of a folding stroller, in which the lower portion of the push rod 2 is rotatably connected with the upper portion of the front support 4, and the upper portion of the rear support 5 is rotatably connected with the push rod 2. A seat saddle 25 is connected to the frame through a seat saddle connector 24.

Embodiment 6

Figure 28:
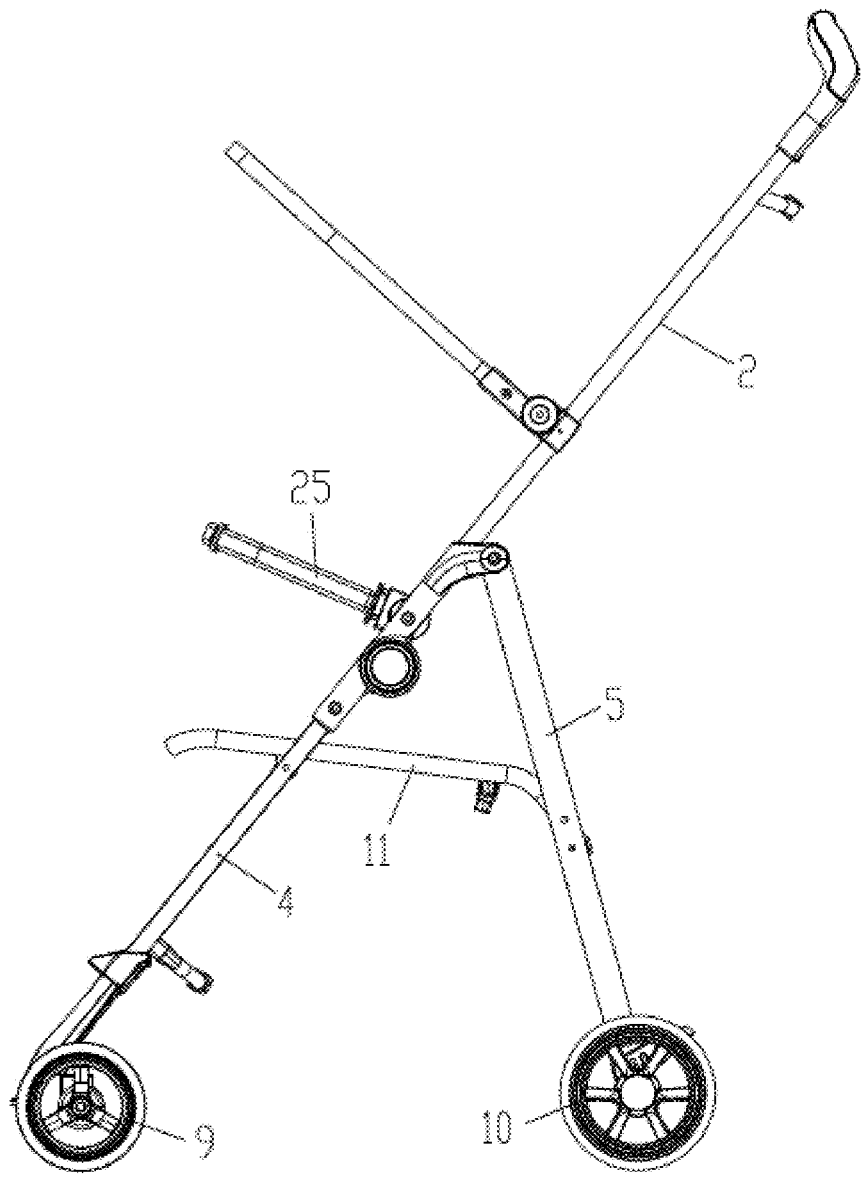
FIG. 28 is a schematic structure diagram of the folding stroller in Embodiment 6.

Referring to FIG. 28, this embodiment provides a frame structure of a folding stroller, in which the lower portion of the push rod 2 is rotatably connected with the upper portion of the front support 4, and the upper portion of the rear support 5 is rotatably connected with the push rod 2. The push rod 2 is connected with an armrest 26, a seat rod 11 is connected between the front support 4 and the rear support 5, and the front and rear portions of the seat rod 11 are rotatably connected with the front support 4 and the rear support 5, respectively.

Embodiment 7

Figure 29:
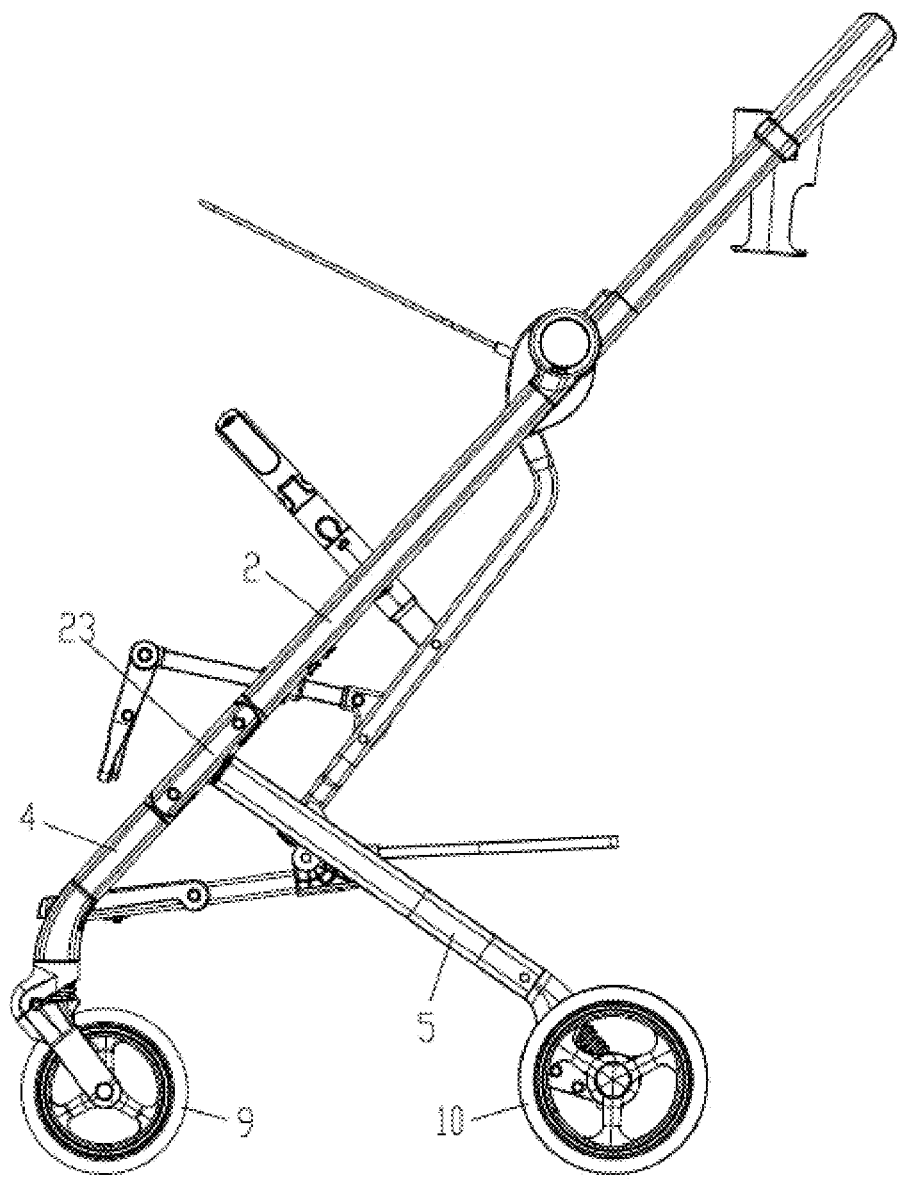
FIG. 29 is a schematic structure diagram of the folding stroller in Embodiment 7.

Referring to FIG. 29, this embodiment provides a frame structure of a folding stroller, in which the upper end of the rear support 5 is fixedly connected with a U-shaped connector 23, and the lower portion of the push rod 2 and the upper portion of the front support 4 are rotatably connected with the connector 23.

Embodiment 8

Figure 30:
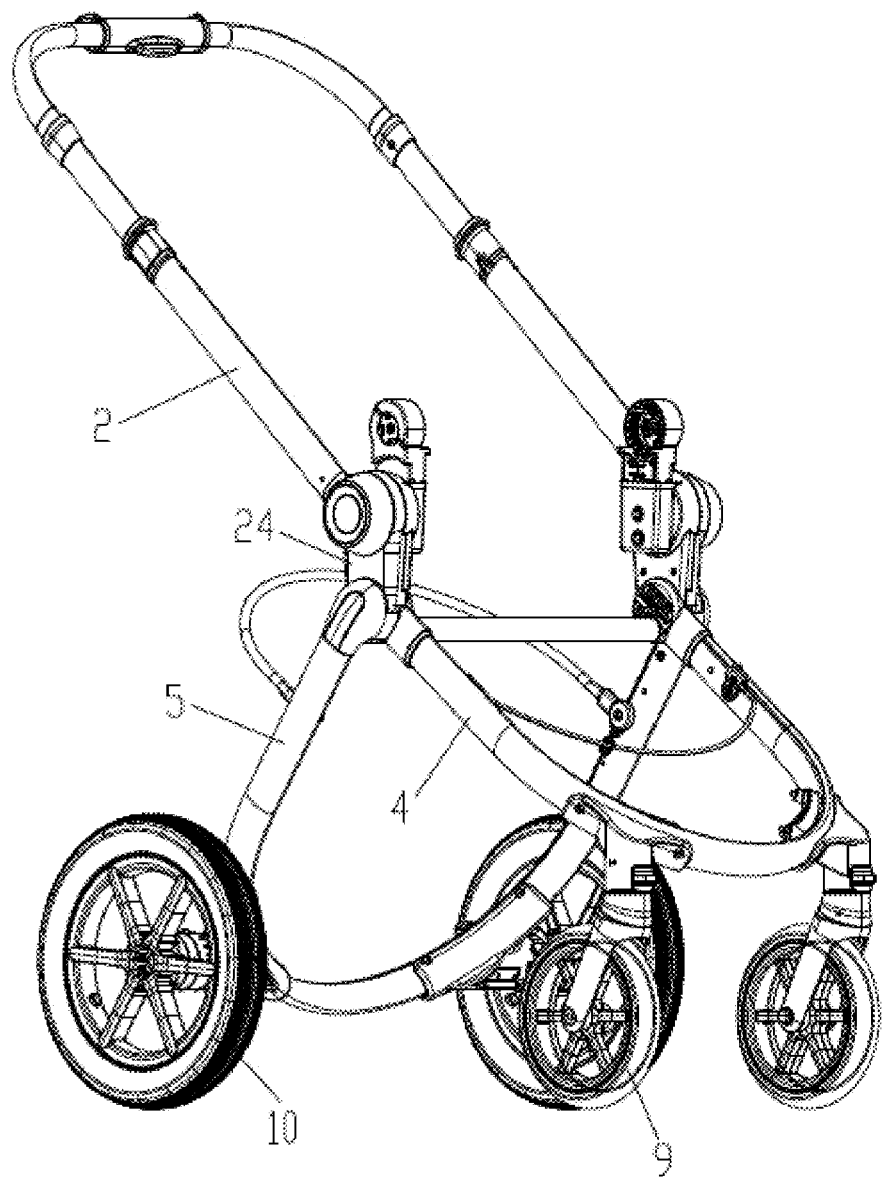
FIG. 30 is a schematic structure diagram of the folding stroller in Embodiment 8.

Referring to FIG. 30, this embodiment provides a frame structure of a folding stroller, in which the upper portion of the front support 4 and the upper portion of the rear support 5 are rotatably connected, a seat saddle connector 24 is fixedly connected with the upper portion of the front support 4 or the upper portion of the rear support 5, and the lower portion of the push rod 2 is rotatably connected with the seat saddle connector 24.

In the folding strollers in the above embodiments, the front wheels and rear wheels are automatically turned to the inside of the frame when folding the frame, and are located on the left and right inner sides of the frame, and the wheel axles extend in the front-rear direction. After the whole stroller is folded, it is flat, very small in size and self-standing, and is simple in structure, clever in design and convenient in operation.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

We claim:

1. A folding stroller comprising:
a frame capable of being unfolded and folded;
a front wheel connected to a bottom of the frame; and
a rear wheel connected to a bottom of the frame, wherein the frame comprises a push rod, a front support connected to the front wheel at a bottom, and a rear support connected to the rear wheel at a bottom, any two of the push rod, the front support and the rear support are rotatably connected with each other, a remaining one is rotatably connected to at least one of the two;
wherein, when the frame is in an unfolded state, the push rod, the front support and the rear support are unfolded with respect to one another, and when the frame is in a folded state, the push rod, the front support and the rear support are close to one another, and the front wheel and the rear wheel are turned so that axles thereof extend along a front-rear direction;
wherein a first wheel turnover mechanism is provided between the front support and the front wheel, a second wheel turnover mechanism is provided between the rear support and the rear wheel, and the first wheel turnover mechanism and the second wheel turnover mechanism both act to turn over the front wheel and the rear wheel respectively during a transition of the frame from the unfolded state to the folded state;
wherein at least one of the first wheel turnover mechanism and the second wheel turnover mechanism comprises a wheel connector capable of being pivotally and slidably connected with the front support or the rear support and comprising a spiral groove, a drive rod provided on the front support or the rear support and capable of being slidably connected with the spiral groove, and a drive part driven to move by folding the frame and capable of driving the wheel connector to slide, and the front wheel or the rear wheel is mounted on the wheel connector.

2. The folding stroller according to claim 1, wherein the frame further comprises:
an upper push rod rotatably connected with an upper portion of the push rod;
an upper connecting rod, an upper portion thereof being rotatably connected with a lower portion of the upper push rod, and the upper connecting rod being rotatably connected with the rear support;
a front connecting rod, a front portion thereof being rotatably connected with the front support;

a rear connecting rod, a front portion thereof being rotatably connected with the front connecting rod, and a rear portion of the rear connecting rod being rotatably connected with the rear support; and a lower sliding sleeve slidably connected to the rear connecting rod along a length direction of the rear connecting rod, a lower portion of the upper connecting rod being rotatably connected with the lower sliding sleeve.

3. The folding stroller according to claim 2, wherein at least one of the first wheel turnover mechanism and the second wheel turnover mechanism comprises a wheel connector capable of being pivotally connected with the front support or the rear support and comprising a spiral groove, a drive rod of which an end portion is slidably connected with the spiral groove, and a first connecting piece connected with the drive rod, the first connecting piece is rotatably connected with the front connecting rod or the rear connecting rod, and the front wheel or the rear wheel is mounted on the wheel connector.

4. The folding stroller according to claim 1, wherein the first turnover mechanism and the second turnover mechanism have a same structure, and both are symmetrically provided on a front side and a rear side of the folding stroller.

5. The folding stroller according to claim 2, wherein a lower portion of the push rod, an upper portion of the front support and an upper portion of the rear support are coaxially and rotatably connected.

6. The folding stroller according to claim 5, wherein the frame further comprises:

a seat rod, a front portion thereof being rotatably connected with the rear support, and a rear portion thereof being rotatably connected with the upper connecting rod;

a seat plate slidably connected with the seat rod along the front-rear direction; and a pull rod, a front portion thereof being rotatably connected with the seat plate, and a rear portion thereof being rotatably connected with the upper connecting rod.

7. The folding stroller according to claim 6, further comprising two rear supports which are arranged symmetrically on a left side and a right side of the folding stroller, and a rear transverse rod is fixedly connected between the two rear supports, and a front portion of the seat rod is rotatably connected to the rear transverse rod.

8. The folding stroller according to claim 5, wherein the frame further comprises a seat rod of which a rear portion is rotatably connected with the upper connecting rod, and an upper sliding sleeve slidably connected to the seat rod along a length direction of the seat rod and rotatably connected to the push rod.

9. The folding stroller according to claim 1, wherein the frame further comprises a seat saddle connector connected to a rear portion of the push rod, and a seat saddle rotatably connected with the seat saddle connector.

10. The folding stroller according to claim 9, wherein the seat saddle connector is connected with the lower portion of the push rod and located inside the push rod, the seat saddle comprises an upper seat saddle surrounding frame of which a lower part is rotatably connected with the seat saddle connector, and a lower seat saddle surrounding frame of which an upper portion is rotatably connected with the seat saddle connector, and the upper seat saddle surrounding frame and the lower seat saddle surrounding frame are located inside the push rod in both left and right directions.

11. The folding stroller according to claim 10, wherein when the frame is in the folded state, the seat saddle connector is located on an upper portion of a folded frame and inside the upper push rod and the push rod, and the upper seat saddle surrounding frame and the lower seat saddle surrounding frame both lean on the folded frame and extend in a same direction as that of the folded frame.

12. The folding stroller according to claim 2, wherein at least one of the first wheel turnover mechanism and the second wheel turnover mechanism comprises a rotating seat of which an upper portion is pivotally connected to a lower portion of the front support or the rear support and of which a lower portion is connected with the front wheel or the rear wheel, a sliding seat slidably connected along a length direction of the front support or the rear support, a first elastic member that directly or indirectly applies force to the sliding seat to make it slide, and a second elastic member that applies force to the rotating seat to pivot relative to the frame, the front connecting rod or the rear connecting rod has a locking part that detachably abuts against the sliding seat, and when the locking part abuts against the sliding seat, a direction of the force applied to the sliding seat by it is opposite to that of the force applied by the first elastic element, and the sliding seat is detachably connected with the rotating seat, and when the sliding seat is connected with the rotating seat, a direction of the force applied to the rotating seat by it is opposite to that of the force applied by the second elastic element; when the folding stroller is in the unfolded state, the locking part abuts against the sliding seat, and the sliding seat is connected with the rotating seat, and when the folding stroller is in the folded state, the front connecting rod or the rear connecting rod is rotated to disengage the locking part from the sliding seat, and the sliding seat is driven by the first elastic element to disengage from the rotating seat, and the rotating seat is driven to rotate by the second elastic element, thereby turning over the front wheel or the rear wheel.

13. A folding stroller comprising:

a frame capable of being unfolded and folded;

a front wheel connected to a bottom of the frame; and a rear wheel connected to a bottom of the frame, wherein the frame comprises a push rod, a front support connected to the front wheel at a bottom, and a rear support connected to the rear wheel at a bottom, any two of the push rod, the front support and the rear support are rotatably connected with each other, a remaining one is rotatably connected to at least one of the two;

wherein, when the frame is in an unfolded state, the push rod, the front support and the rear support are unfolded with respect to one another, and when the frame is in a folded state, the push rod, the front support and the rear support are close to one another, and the front wheel and the rear wheel are turned so that axles thereof extend along a front-rear direction;

wherein a first wheel turnover mechanism is provided between the front support and the front wheel, a second wheel turnover mechanism is provided between the rear support and the rear wheel, and the first wheel turnover mechanism and the second wheel turnover mechanism both act to turn over the front wheel and the rear wheel respectively during a transition of the frame from the unfolded state to the folded state;

wherein the frame further comprises:

an upper push rod rotatably connected with an upper portion of the push rod;

an upper connecting rod, an upper portion thereof being rotatably connected with a lower portion of the upper push rod, and the upper connecting rod being rotatably connected with the rear support;

a front connecting rod, a front portion thereof being rotatably connected with the front support;

a rear connecting rod, a front portion thereof being rotatably connected with the front connecting rod, and a rear portion of the rear connecting rod being rotatably connected with the rear support; and a lower sliding sleeve slidably connected to the rear connecting rod along a length direction of the rear connecting rod, a lower portion of the upper connecting rod being rotatably connected with the lower sliding sleeve.

14. The folding stroller according to claim 13, wherein the first turnover mechanism and the second turnover mechanism have a same structure, and both are symmetrically provided on a front side and a rear side of the folding stroller.

15. The folding stroller according to claim 13, wherein at least one of the first wheel turnover mechanism and the second wheel turnover mechanism comprises a wheel connector capable of being pivotally connected with the front support or the rear support and comprising a spiral groove, a drive rod of which an end portion is slidably connected with the spiral groove, and a first connecting piece connected with the drive rod, the first connecting piece is rotatably connected with the front connecting rod or the rear connecting rod, and the front wheel or the rear wheel is mounted on the wheel connector.

16. The folding stroller according to claim 13, wherein a lower portion of the push rod, an upper portion of the front support and an upper portion of the rear support are coaxially and rotatably connected.

17. The folding stroller according to claim 13, wherein the frame further comprises:

a seat rod, a front portion thereof being rotatably connected with the rear support, and a rear portion thereof being rotatably connected with the upper connecting rod;

a seat plate slidably connected with the seat rod along the front-rear direction; and a pull rod, a front portion thereof being rotatably connected with the seat plate, and a rear portion thereof being rotatably connected with the upper connecting rod.

18. The folding stroller according to claim 13, further comprising two rear supports which are arranged symmetrically on a left side and a right side of the folding stroller, and a rear transverse rod is fixedly connected between the two rear supports, and a front portion of the seat rod is rotatably connected to the rear transverse rod.

19. The folding stroller according to claim 13, wherein the frame further comprises a seat rod of which a rear portion is rotatably connected with the upper connecting rod, and an upper sliding sleeve slidably connected to the seat rod along a length direction of the seat rod and rotatably connected to the push rod.

* * * * *